(12) United States Patent
Yamamoto

(10) Patent No.: US 7,167,258 B2
(45) Date of Patent: Jan. 23, 2007

(54) IMAGE INPUT/OUTPUT SYSTEM, IMAGE INPUT/OUTPUT CONTROL DEVICE, AND CONTROL METHOD THEREFOR USING DEVICE INFORMATION INDICATING ACTIVE EXECUTION OF DATA COMMUNICATION OR PASSIVE EXECUTION OF DATA COMMUNICATION

(75) Inventor: Masahito Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 966 days.

(21) Appl. No.: 09/801,815

(22) Filed: Mar. 9, 2001

(65) Prior Publication Data

US 2001/0030766 A1    Oct. 18, 2001

(30) Foreign Application Priority Data

Mar. 13, 2000   (JP)   ............... 2000-069328

(51) Int. Cl.
*G06F 15/00* (2006.01)
*G06K 1/00* (2006.01)

(52) U.S. Cl. ............. 358/1.15; 358/1.13; 710/8; 710/15

(58) Field of Classification Search ............ 358/1.15, 358/1.11, 1.12, 1.13, 1.14, 448, 1.9, 1.1; 710/8, 10; 709/232, 229
See application file for complete search history.

(56) References Cited

U.S. PATENT DOCUMENTS

| 6,370,147 B1 * | 4/2002 | Beser | 370/401 |
| 6,671,063 B1 * | 12/2003 | Iida | 358/1.15 |
| 6,674,535 B1 * | 1/2004 | Kim | 358/1.15 |

FOREIGN PATENT DOCUMENTS

EP          975145 A2 *    1/2000

* cited by examiner

*Primary Examiner*—Gabriel I. Garcia
*Assistant Examiner*—Thierry L. Pham
(74) *Attorney, Agent, or Firm*—Fitzpatrick, Cella, Harper & Scinto

(57) ABSTRACT

The present invention easily implements a virtual copying machine by connecting a scanner and printer on a network. When a passive scanner and passive printer are connected through a proxy device, the device profiles of the devices are collected to generate a transfer path profile. By referring to the transfer path profile, the proxy device issues an input request to the scanner to cause it read an image, receives the image data, issues an output request to the printer, and transfers the data received from the scanner to the printer to cause it to print the data.

15 Claims, 37 Drawing Sheets

```
Transmission path profile # 234  {
Description :         "Copy scan5 to lp5 - 1"
Path - set :          ((scan5, proxy0, lp5 - 1))
Input - Device :      scan5
Input - Address :     172.16.10.2
Filter - Device :     proxy0
Filter - Address :    172.16.10.10
Transmission - Mode : FTP
Transmission - Trigger : Destination
Resolution :          1200
Data - Format :       JPEG
Output - Device :     lp5 - 1
Output - Address :    172.16.10.5
Transmission - Mode : LPD
Transmission - Trigger : Source
Resolution :          600
Data - Format :       LIPSIV
}
```

FIG. 7

```
Device profile # 3da  {
Device - Type :         input - device / scanner
Device - Id :           scan5
Device - Address :      172.16.10.2
Transmission - Mode :   FTP/Passive
Resolution :            1200
Data - Format :         JPEG, GIF, LIPSIV
}
```

FIG. 8

```
Device profile # 3dc    {
Device - Type :         output - device / printer
Device - Id :           1pt5 - 1
Device - Address :      172.16.10.5
Transmission - Mode :   LPD/Passive, FTP/Passive
Resolution :            600
Data - Format :         LIPSIV
}
```

FIG. 9

```
Device profile # 3dx   {
Device - Type :            filter - device / conv
Device - Id :              proxy0
Device - Address :         172.16.10.10
Receive - Transmission - Mode :   FTP/{Passive, Active}
Send - Transmission - Mode :      FTP/{Passive, Active}
Receive - Resolution :    1200,600,400,300
Send - Resolution :       1200,600,400,300,100
Receive - Data - Format :  JPEG
Send - Data - Format :     JPEG, GIF, LIPSIV
}
```

FIG. 14

```
Transmission path profile # 234   {
Description :           "Copy scan5 to lp5 - 1"
Path - set :            ((scan5, proxy0, lp5 - 1))
Input - Device :        scan5
Input - Address :       172.16.10.2
Filter - Device :       proxy0
Filter - Address :      172.16.10.10
Transmission - Mode :   FTP
Transmission - Trigger : Destination
Resolution :            1200
Data - Format :         JPEG
Output - Device :       lp5 - 1
Output - Address :      172.16.10.5
Transmission - Mode :   LPD
Transmission - Trigger : Source
Resolution :            600
Data - Format :         LIPSIV
}
```

F I G. 15

```
Virtual device # 413a {
Transmission - Profile :  # 234
User - Profile :          #taro11
Display - Comment :       "Copy : lp5 - 1 ; taro"
}
```

Copy : lp5 - 1 ; t

FIG. 21

```
Device profile # 3da  {
Device - Type :         input - device / scanner
Device - Id :           scan5
Device - Address :      172.16.10.2
Transmission - Mode :   FTP/Active
Resolution :            1200
Data - Format :         JPEG, GIF, LIPSIV
}
```

FIG. 22

```
Device profile # 3dc    {
Device - Type :         output - device / printer
Device - Id :           1pt5 - 1
Device - Address :      172.16.10.5
Transmission - Mode :   FTP/Active
Resolution :            600
Data - Format :         LIPSIV
}
```

FIG. 23

```
Transmission path profile # 234   {
Description :           "Copy scan5 to lp5 - 1"
Path - set :            ((scan5, proxy0, lp5 - 1))
Input - Device :        scan5
Input - Address :       172.16.10.2
Filter - Device :       proxy0
Filter - Address :      172.16.10.10
Transmission - Mode :   FTP
Transmission - Trigger : Source
Resolution :            1200
Data - Format :         JPEG
Output - Device :       lp5 - 1
Output - Address :      172.16.10.5
Transmission - Mode :   FTP
Transmission - Trigger : Destination
Resolution :            600
Data - Format :         LIPSIV
}
```

FIG. 28

```
Transmission path profile # 234   {
Description :          "Copy scan5 to lp5 - 1"
Path - set :           ((scan5, proxy0, lp5 - 1))
Input - Device :       scan5
Input - Address :      172.16.10.2
Filter - Device :      proxy0
Filter - Address :     172.16.10.10
Transmission - Mode :  FTP
Transmission - Trigger : Source
Resolution :           1200
Data - Format :        JPEG
Output - Device :      lp5 - 1
Output - Address :     172.16.10.5
Transmission - Mode :  LPD
Transmission - Trigger : Source
Resolution :           600
Data - Format :        LIPSIV
}
```

FIG. 32

```
Transmission path profile # 234    {
Description :              "Copy scan5 to lp5 - 1"
Path - set :               ((scan5, proxy0, lp5 - 1))
Input - Device :           scan5
Input - Address :          172.16.10.2
Filter - Device :          proxy0
Filter - Address :         172.16.10.10
Transmission - Mode :      FTP
Transmission - Trigger :   Destination
Resolution :               1200
Data - Format :            JPEG
Output - Device :          lp5 - 1
Output - Address :         172.16.10.5
Transmission - Mode :      FTP
Transmission - Trigger :   Destination
Resolution :               600
Data - Format :            LIPSIV
}
```

FIG. 34A

```
Device profile # 3da   {
Device - Type :        input - device / scanner
Device - Id :          scan5
Device - Address :     172.16.10.2
Transmission - Style : Active - send
Transmission - Mode :  FTP/LPD
Resolution :           400, 600, 1200
Media - Size:          A4, A5, B4
Data - Format :        JPEG, GIF, LIPSIV
}
```

FIG. 34B

```
Device profile # 3dx   {
Device - Type :        filter / tee
Device - Id :          proxy0
Device - Address :     172.16.10.3
Transmission - Style : Passive - receive, Active - receive,
                       Passive - send, Active - send
Transmission - Mode :  LPD
Transmission - Type :  Sequential ; source = single,
                       destination = multi
}
```

FIG. 34C

```
Device profile # 3dlp53   {
Device - Type :        output / printer
Device - Id :          lp5 - 3
Device - Address :     172.16.10.10
Output - Tray :        Lower
Transmission - Mode :  FTP/LPD
Resolution :           300, 600
Media - Size:          A4, A3
Data - Format :        LIPSIV, PostScript
}
```

FIG. 35

```
Transmission path profile # 234  {
Description :            "Copy scan5 to lp5 - 3, lp5 - 1 via proxy0"
Input - Device :         scan5
Input - Address :        172.16.10.2
Filter - Set :           proxy0 = lp5 - 3, lp5 - 1
Filter - Device :        proxy0
Filter - Address :       172.16.10.3
Transmission - Mode :    LPD
Resolution :             600
Media - Size :           A4
Data - Format :          LIPSIV
Output - Set :           lp5 - 3, lp5 - 1
Output - Device :        lp5 - 3
Output - Address :       172.16.10.10
Output - Tray :          Lower
Transmission - Mode :    LPD
Resolution :             600
Media - Size :           A4
Data - Format :          LIPSIV
Output - Device :        lp5 - 1
Output - Address :       172.16.10.5
Output - Tray :          Any
Transmission - Mode :    LPD
Resolution :             600
Media - Size :           A4
Data - Format :          LIPSIV
}
```

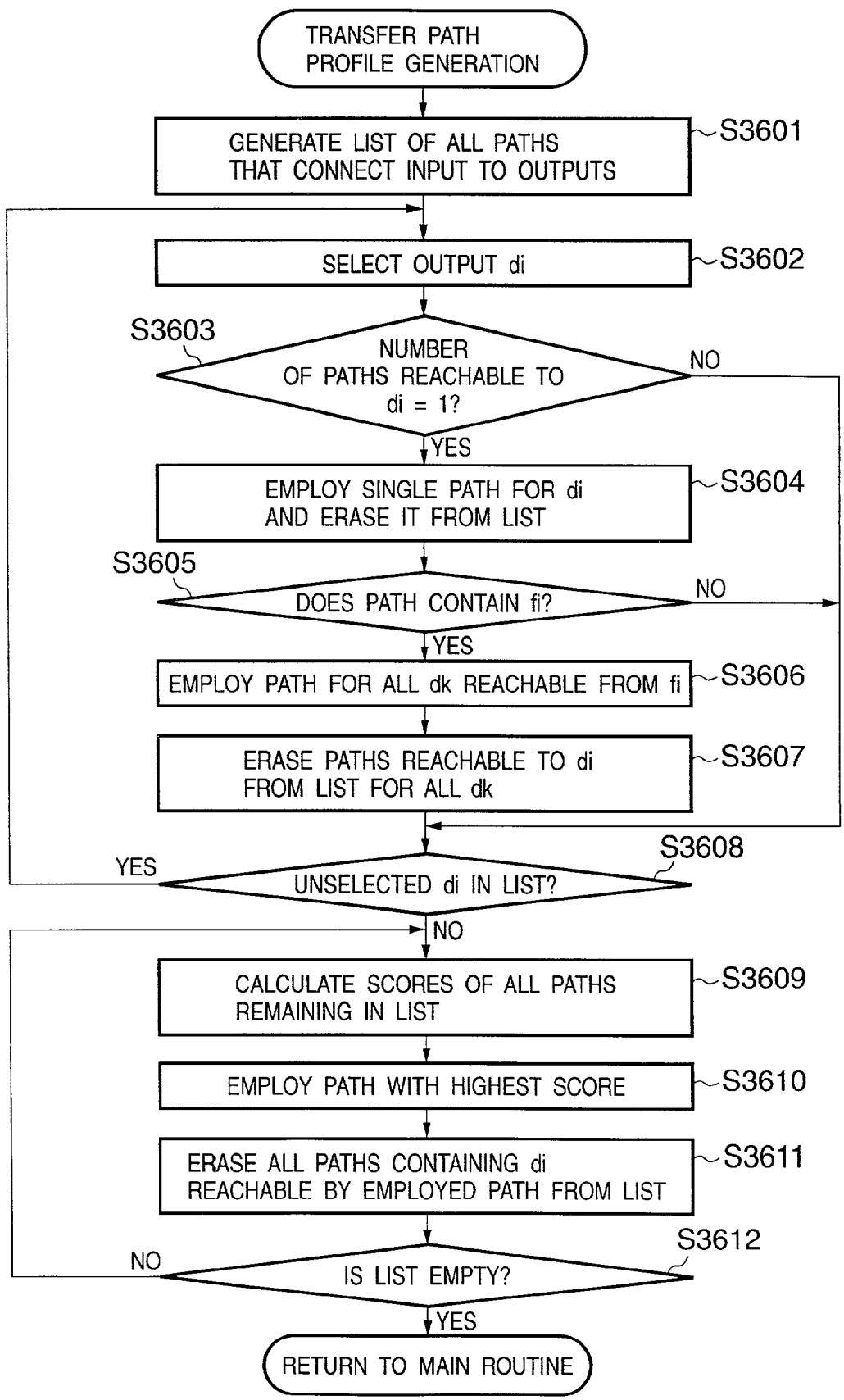

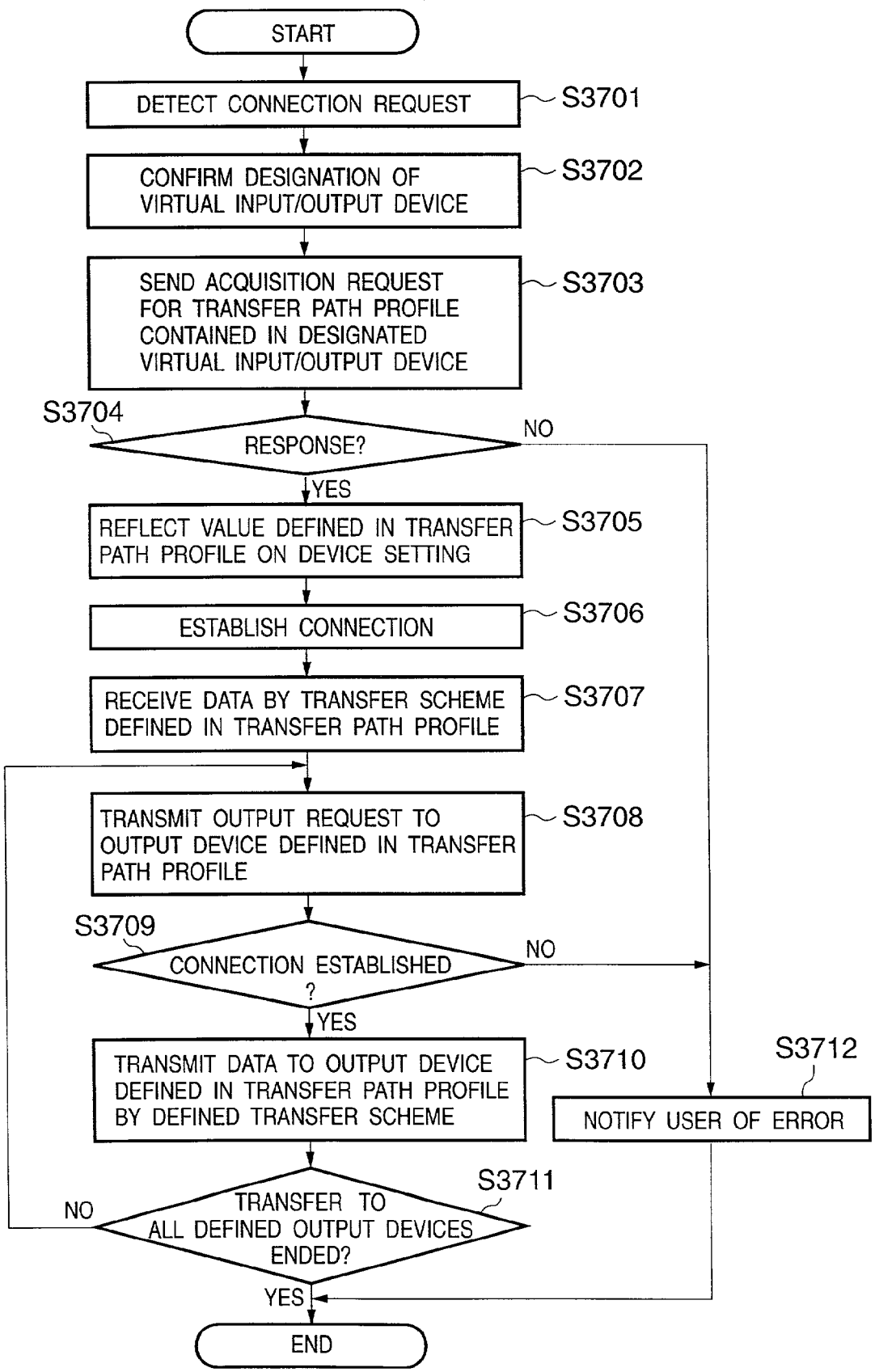

IMAGE INPUT/OUTPUT SYSTEM, IMAGE INPUT/OUTPUT CONTROL DEVICE, AND CONTROL METHOD THEREFOR USING DEVICE INFORMATION INDICATING ACTIVE EXECUTION OF DATA COMMUNICATION OR PASSIVE EXECUTION OF DATA COMMUNICATION

FIELD OF THE INVENTION

The present invention relates to an image input/output system constituted by input and output devices connected through, e.g., a network, an image input/output control device, and a control method therefor.

BACKGROUND OF THE INVENTION

Conventionally, a digitized input device such as an image scanner, digital camera, facsimile receiver, or image file system (reading section) is generally connected to a computer and executes input processing under the control of the computer. That is, the input device plays a passive role that data is extracted by the connected computer. In recent years, push-type input devices have also been developed, in which the input device side actively executes the input processing and sends data to a data sending destination.

Conventionally, a digitized output device such as a printer, facsimile transmitter, or image file system (writing section) is generally connected to a computer and executes output processing under the control of the computer. That is, the output device plays a passive role that data is sent from the connected computer. In recent years, pull-type output devices have also been developed, in which the output device side actively reads out data from a data sending source and executes the output processing.

A scheme of building a multi-functional system is known, in which an input device and an output device are connected directly (i.e., without intervening any computer serving as a control entity and data mediator), and the functions of the devices are combined, thereby providing a composite function. In such a multi-functional system, the input and output devices can be connected only when the interface condition of the input device matches that of the output device, including the protocol and input/output speed, control system, transferable data format, and image resolution. For this reason, input and output devices can be directly connected in only a fixed combination where the interface conditions are designed in advance to match each other. As such a multi-functional system, for example, a digital copying machine which connects a push-type image scanner to a plurality of passive printers through cables in advance has been developed. This system can implement, e.g., multiple copy for obtaining copy outputs in number equal to the number of printers by one scanning cycle for an original page. Such a system in which a single input device and a plurality of output devices are permanently combined has been developed.

The network technology represented by the Ethernet recently exhibits remarkable progress and expansion. Not only a number of input and output devices are connected to a single LAN but also Internet connection between a plurality of LANs makes it possible to combine an input device connected to a LAN with an output device connected to another LAN. Additionally, the configuration is often usually modified by adding or removing an input or output device to or from a network. Hence, an enormous number of input and output devices, which are reachable through a network, i.e., which are combinable in principle, form combinations dynamically, so a demand has arisen for a method of building not only a system with a fixed combination but also a combination-type multi-functional system flexibly using a set of combinable input and output devices at a time. To meet this requirement, a multi-functional system has also been developed, in which a combination of connectable input and output devices is found by negotiation between the input and output devices for the interface condition, i.e., the combination is variable.

Another system has been developed, in which when the input and/or output device supports a plurality of interface conditions, the input and output devices negotiate in advance to determine interface conditions under which the devices can be connected, and the input and output devices are connected under the respective interface conditions. The present inventors have previously proposed a method of building a virtual input/output device (system) based on a transfer path profile. According to this method, information (to be referred to as a device profile) representing the characteristics of each device connected to a network is managed by a database. In addition, transfer path information for a combination of combinable input and output devices which are selected on the basis of the device profiles and transfer condition information related to transfer (these pieces of information will be referred to as a transfer path profile) are also managed by the database. The user accesses the database from the operation panel of an input or output device and selects a transfer path profile, a composite function formed from a complex combination of input and output devices can be designated and used by a simple user interface. Furthermore, the input/output device group that forms the transfer path can be controlled on the basis of the transfer path profile.

In the above-described method of building a combination-type multi-functional system using a "transfer path profile", the input and output devices can be flexibly and dynamically combined. However, the combinations of combinable devices are limited to a combination of an active input device and a passive output device and a combinations of a passive input device and an active output device. More specifically, in attempting to combine, e.g., a push-type scanner with a pull-type printer, these devices cannot be actually combined because both the devices are designed to actively start data transfer, and the transfer control directions do not match.

Conversely, in attempting to combine a conventional passive scanner with a passive printer, these devices cannot be actually combined because both the devices are designed to wait for a transfer instruction from the other party of data transfer, and the transfer control directions do not match.

For this reason, even when a number of input and output devices are connected to a reachable network, the number of combinations available as transfer path profiles may be substantially small depending on the transfer control directions of the input and output devices. That is, many kinds of input and output devices connected to the network cannot be effectively put into a transfer path profile because of mismatching in assumed transfer control direction.

In the conventional method of building a combination-type multi-functional system using a transfer path profile, input and output devices can be flexibly and dynamically combined. However, only a combination of input and output devices whose processible transfer data formats completely match can be included in the transfer path profile. More specifically, a virtual input/output device can be constituted only when the transfer data expression format such as an image format or resolution for image data transfer or, e.g., a page description language (PDL) for page description data transfer matches between the input and output devices. For this reason, even when a number of input and output devices are connected to a network, the number of combinations available as transfer path profiles may be substantially small depending on the data format processed by the input and output devices. That is, many kinds of input and output devices connected to the network cannot be effectively put into a transfer path profile because of mismatching in processible transfer data expression format.

In the prior art, input and output devices can be flexibly and dynamically combined. However, to implement a virtual input/output device formed from a combination of one input device and a plurality of output devices, processing that must be executed by the input device is complex because the input device side takes the responsibility of data transfer processing for each of the plurality of output devices. Hence, the input device must have a control procedure for data transfer to a plurality of output devices in advance even when the input device is used to simply create input data and transfer the data to a single destination. This generates stricter requirements for resources necessary to constitute the device, i.e., resources such as the CPU performance, memory capacity, and network interface performance, resulting in an increase in cost of the output device.

SUMMARY OF THE INVENTION

The present invention has been made to solve the above problems, and has as its first object to provide a multi-functional system which easily constitutes a number of virtual input and output devices from input and output devices connected to a network by combining input and output devices which cannot be simply connected because of mismatching in device characteristics, and a control method therefor.

Especially, it is another object of the present invention to provide a multi-functional system capable of easily constituting virtual input and output devices by combining input and output devices whose data transfer control directions do not match, and a control method therefor.

Especially, it is still another object of the present invention to provide an image input/output system and image input/output control device which are capable of easily constituting virtual input and output devices by combining input and output devices having different processible transfer data expression formats, and a control method therefor.

It is the second object of the present invention to implement an image input/output system which reduces load necessary for an input device in implementing a composite function for an input and multiple outputs, eliminates the necessity to equip the input device with a high-performance CPU or large-capacity or high-speed memory, and includes an inexpensive input device, an image input/output control device and a control method therefor.

It is the third object of the present invention to provide an image input/output system and image input/output control device and control method therefor which attain a simple and versatile input device by eliminating the necessity to make the input device compatible to output devices with different transfer processing capabilities such as transfer parameters and also facilitate the system configuration and system management.

In order to achieve the above objects, the present invention has the following arrangement.

There is provided an image input/output control device in an image input/output system in which each of a plurality of image input/output control devices which are connected to a network to input, output, and relay an image announces device information related to device control through the network, transfer path information is generated, stored, and managed in advance, the transfer path information containing at least information for uniquely identifying information that describes a transfer path for combining the plurality of devices and information that describes characteristics of transfer control between the devices of the path, and at least one of the devices of the transfer path searches for, acquires, and uses the transfer path information, thereby executing distributed coordinated image input/output processing between the devices together with image data transfer from the input device to the output device, comprising:

transfer path information search means for searching a server for the transfer path information representing that the image input/output control devices is contained in a transfer path and for receiving the transfer path information;

operation means for causing a user to select a desired transfer path from the searched transfer path information and activate document processing using the transfer path;

image data reception means for receiving image data by controlling the input device referred to by the selected transfer path information;

image data transmission means for transmitting the received image data by controlling the output device referred to by the selected transfer path information; and device information announcement means for announcing, through the network, the device information containing information representing that the image data reception means can actively control another device and information representing that the image data transmission means can actively control another device, wherein data transfer between the input device and the output device is relayed.

Preferably, control is performed by causing the image data reception means to transmit the searched transfer path information to the input device in controlling the input device, and the image data transmission means to transmit at least the searched transfer path information to the output device in controlling the output device.

There is also provided an image input/output control device in an image input/output system in which each of a plurality of image input/output control devices which are connected to a network to input, output, and relay an image announces device information related to device control through the network, transfer path information is generated, stored, and managed in advance, the transfer path information containing at least information for uniquely identifying information that describes a transfer path for combining the plurality of devices and information that describes characteristics of transfer control between the devices of the path, and at least one of the devices of the transfer path searches for, acquires, and uses the transfer path information, thereby executing distributed coordinated image processing between the devices together with image data transfer from the image input device to the image output device, comprising:

image data reception means for receiving image data in accordance with control from the input device;

image data transmission means for transmitting the received image data to the output device in accordance with control from the output device; and device information announcement means for announcing, through the network, the device information containing information representing that the image data reception means can be passively controlled by another device and information representing that the image data transmission means can be passively controlled by another device, wherein data transfer between the input device and the output device is relayed.

Preferably, the image data reception means comprises first transfer path identification means for receiving information for identifying the transfer path information under the control of the input device, the image data transmission means comprises second transfer path identification means for receiving information for identifying the transfer path information under the control of the output device, and the image data transmission means transmits and relays, to the output device, the image data received from the input device when the transfer path identified by the first transfer path identification means matches the transfer path identified by the second transfer path identification means.

There is also provided an image input/output control device in an image input/output system in which each of a plurality of image input/output control devices which are connected to a network to input, output, and relay an image announces device information related to device control through the network, transfer path information is generated, stored, and managed in advance, the transfer path information containing at least information for uniquely identifying information that describes a transfer path for combining the plurality of devices and information that describes characteristics of transfer control between the devices of the path, and at least one of the devices of the transfer path searches for, acquires, and uses the transfer path information, thereby executing distributed coordinated image processing between the devices together with image data transfer from the image input device to the plurality of image output devices, comprising:

image data reception means for receiving image data from another device through the network;

image data conversion means for converting an expression format of the received image data;

image data transmission means for transmitting the converted image data to another device through the network;

device information announcement means for announcing, through the network, the device information containing at least information of a data expression format receivable by the image data reception means and a data expression format transmittable from the image data transmission means; and transfer path information reception means for receiving the transfer path information containing at least a transfer destination to which the received image data is to be transmitted and a data expression format used for transmission to the transfer destination, wherein the received image data is converted and transmitted to the transfer destination in accordance with the received transfer path information.

The data conversion means preferably converts an image format.

The data conversion means preferably converts an image resolution.

The data conversion means preferably converts an image depth.

The data conversion means preferably performs data conversion with image processing including image trimming, enlargement/reduction, deformation, edge extraction, and color conversion.

The data conversion means preferably converts the image data into coded data by encoding processing such as character recognition processing.

The data conversion means preferably converts the image data into a structured image format by image region separation processing and encoding processing.

The data conversion means preferably converts coded data into the image data by rasterization image processing.

The data conversion means preferably converts a data compression scheme and/or data compression ratio.

The data conversion means preferably converts a page description format.

There is also provided an image input/output control device in an image input/output system in which each of a plurality of image input/output control devices which are connected to a network to input, output, and relay an image announces device information related to device control through the network, transfer path information is generated, stored, and managed in advance, the transfer path information containing at least information for uniquely identifying information that describes a transfer path for combining the plurality of devices and information that describes characteristics of transfer control between the devices of the path, and at least one of the devices of the transfer path searches for, acquires, and uses the transfer path information, thereby executing distributed coordinated image processing between the devices together with image data transfer from the image input device to the plurality of image output devices, comprising:

image data transfer means for receiving image data from another device through the network and transmitting the image data to another device through the network;

device information announcement means for announcing, through the network as the device information, device information containing at least a transmission method and a data type transmittable/receivable by the image data transfer means;

image data storage means for temporarily storing the received image data; and transfer path information reception means for receiving the transfer path information containing at least not less than one transfer destination to which the received image data is to be transmitted, and the data type and transmission method used for transmission to the transfer destination, wherein the received and stored image data is transmitted and relayed to the not less than one transfer destination in accordance with the received transfer path information.

There is also provided a transfer path information generation device for generating a transfer path in an image input/output system in which each of a plurality of image input/output control devices which are connected to a network to input, output, and relay an image announces device information related to device control through the network, transfer path information is generated, stored, and managed in advance, the transfer path information containing at least information for uniquely identifying information that describes the transfer path for combining the plurality of devices and information that describes characteristics of transfer control between the devices of the path, and at least one of the devices of the transfer path searches for, acquires, and uses the transfer path information, thereby executing distributed coordinated image processing between the devices together with image data transfer from the input device to the plurality of output devices, comprising:

input/output device selection means for selecting a combination of the input device and at least one output device;

search means for searching for all paths from the input device selected by the input/output device selection means to each of the at least one output device directly or through at least one relay device and generating a candidate path list including pieces of information for identifying all the paths;

reachable path counting means for counting the number of paths reaching to each of the output devices for at least one output device selected by the input/output device selection means from all the paths searched by the all path searching means;

first path determination means for, when the number of paths counted by the reachable path counting means is one, determining to employ the single path as a path reachable to the image output device;

first candidate path erase means for removing, from the candidate path list, all paths reachable to the output device through the path employed by the first path determination means;

second path determination means for determining to employ a path through the relay device as the path reachable to the output device for each of the output devices reachable from the image relay device contained in the path determined by the first path determination means;

second candidate path erase means for removing, from the candidate path list, all paths reachable to the output device through the path employed by the second path determination means;

relay path counting means for scanning the candidate paths in the candidate path list and counting the number of paths relayed through each of the relay devices contained in the paths;

third path determination means for determining a relay device which most frequently relays to the target output device by comparing, between the relay devices, the numbers of relay paths counted by the relay path counting means, and determining to employ a path containing the relay device; and third candidate path erase means for removing, from the candidate path list, all paths reachable to the output device through the path employed by the third path determination means, wherein the relay path counting means, third path determination means, and third candidate path erase means repeat determination and erase of the paths until the candidate path list becomes empty, thereby determining all paths.

The device preferably further comprises fourth path determination means for, when a maximum value of the number of target output devices reachable through the relay devices counted by the relay path counting means is one, and a path for directly connecting the input device and the output device without intervening any relay device is present, determining to preferentially employ the path for directly connecting the input and output devices, and fourth candidate path erase means for removing, from the candidate path list, all paths reachable to the output device through the path employed by the fourth path determination means.

An image input/output control device is inserted between an image input device and an image output device to relay transfer of image data from the image input device to the image output device.

Preferably, the image input and output devices are active devices or passive devices, and transfer of the image data from the active image input device to the active image output device or transfer from the passive image input device to the passive image output device is relayed.

Preferably, the device further comprises operation means, and when the image data is to be relayed between the passive image input device and the passive image output device, the image data is input from the image input device, and the input image data is output to the image output device in accordance with an input from the operation means.

Preferably, when the image data is to be relayed between the active image input device and the active image output device, the image data is input from the image input device in accordance with a request from the image input device, and the input image data is output to the image output device in accordance with a request from the image output device.

The device preferably further comprises conversion means for converting an expression format of the image data input from the image input device into an expression format processible by the image output device.

The conversion means preferably performs at least one of conversion of an image format, conversion of an image resolution, conversion of an image depth, conversion from the image data to coded data, conversion from the image data to a structured image format, conversion from coded data to the image data, conversion of a data compression scheme, and conversion of a page description format.

The image data input from the image input device is preferably output to a plurality of image output devices.

Preferably, an image input/output system is characterized in that the system is formed by connecting the above image input/output control device, image input device, and image output device through a network.

The system preferably further comprises generation means for collecting pieces of profile information representing characteristics of the image input device, image output device, and image input/output control device connected to the network and generating path information for transferring image data from the image input device to the image output device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing the device profile of a passive input device in the first embodiment;

FIG. 8 is a view showing the device profile of a passive output device in the first embodiment;

FIG. 9 is a view showing the device profile of a proxy device in the first embodiment;

FIG. 14 is a view showing a transfer path profile in which a passive input device and a passive output device are combined in the first embodiment;

FIG. 15 is a view showing the virtual input/output device profile of the first embodiment;

FIG. 21 is a view showing the device profile of an active input device in the second embodiment;

FIG. 22 is a view showing the device profile of an active output device in the second embodiment;

FIG. 23 is a view showing a transfer path profile in which the active input device and active output device are combined in the second embodiment;

FIG. 28 is a view showing a transfer path profile according to the third embodiment;

FIG. 32 is a view showing a transfer path profile in which a passive input device and an active output device are combined in the fourth embodiment;

FIGS. 34A, 34B, and 34C are views showing device profiles according to the fifth embodiment;

FIG. 35 is a view showing the transfer path profile according to the fifth embodiment;

FIG. 36 is a flow chart showing the transfer path profile definition procedure of the fifth embodiment; and FIG. 37 is a flow chart showing relay processing by a proxy device of the fifth embodiment.

DETAILED DESCRIPTION OF THE PREFERRED EMBODIMENTS

The embodiments of the present invention will be described below with reference to the accompanying drawings.

[First Embodiment]

Figure 1:
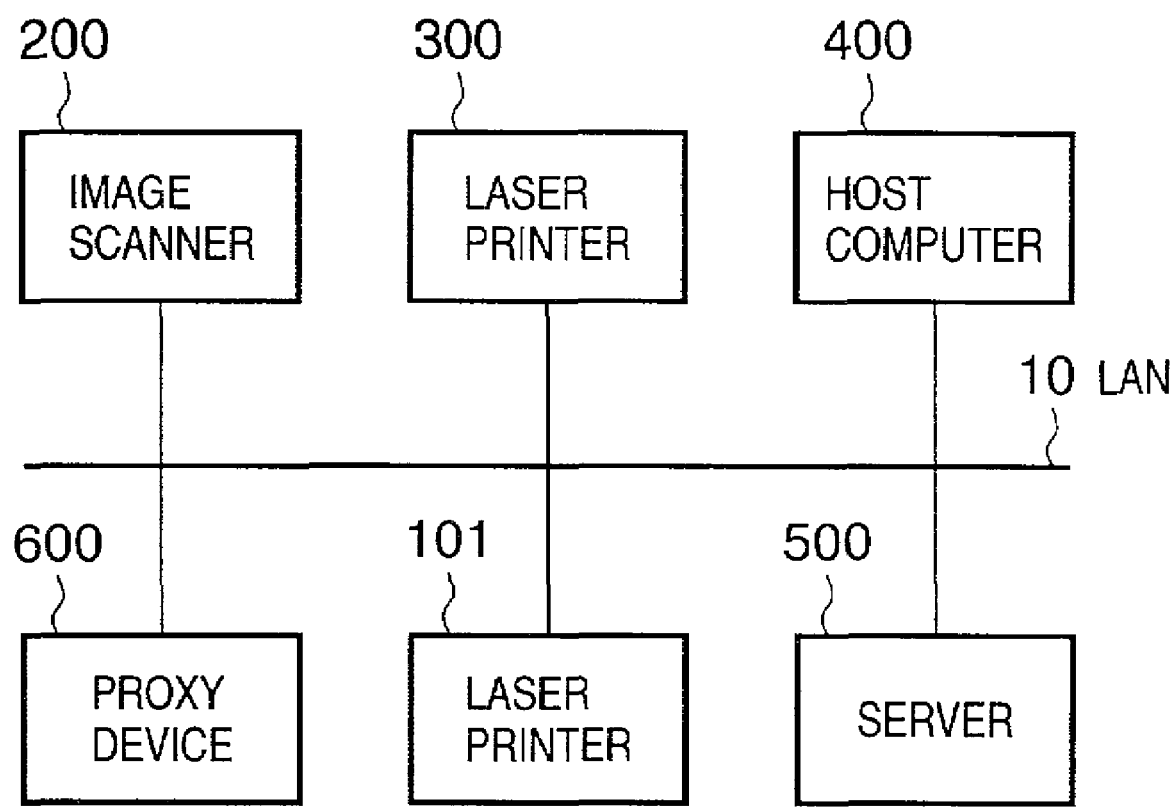
FIG. 1 is a block diagram showing the arrangement of a network according to the first embodiment, to which input and output devices are connected.

FIG. 1 is a block diagram showing the arrangement of a network including one image scanner and two laser printers. Each of the image scanner and laser printers has a network board to connect itself to the network. Referring to FIG. 1, a laser printer 101 is a laser beam printer having the same arrangement as that of a laser printer 300. One proxy device is also connected.

The network board of each device is connected to a local area network (LAN) 10 through a LAN interface such as a 10Base2 as an Ethernet interface having a coaxial connector or 10Base-T having RJ45.

A plurality of host computers including a host computer 400 are also connected to the LAN. These host computers can communicate with the network board of each device under the control of the network operating system.

A server computer 500 is connected to the LAN 10. The server computer 500 can communicate with the host computer or the network board of each device under the control of the network operating system.

<Arrangement of Device>

The arrangements of the image scanner as an input device suitable for application of this embodiment and the laser printer as an output device will be described next with reference to FIGS. 2 and 3. The application range of this embodiment is not limited to the image scanner or laser beam printer. This embodiment can also be applied to general digital information processing devices of any other input/output scheme, such as a facsimile device, digital camera, and image filing device.

Figure 2:
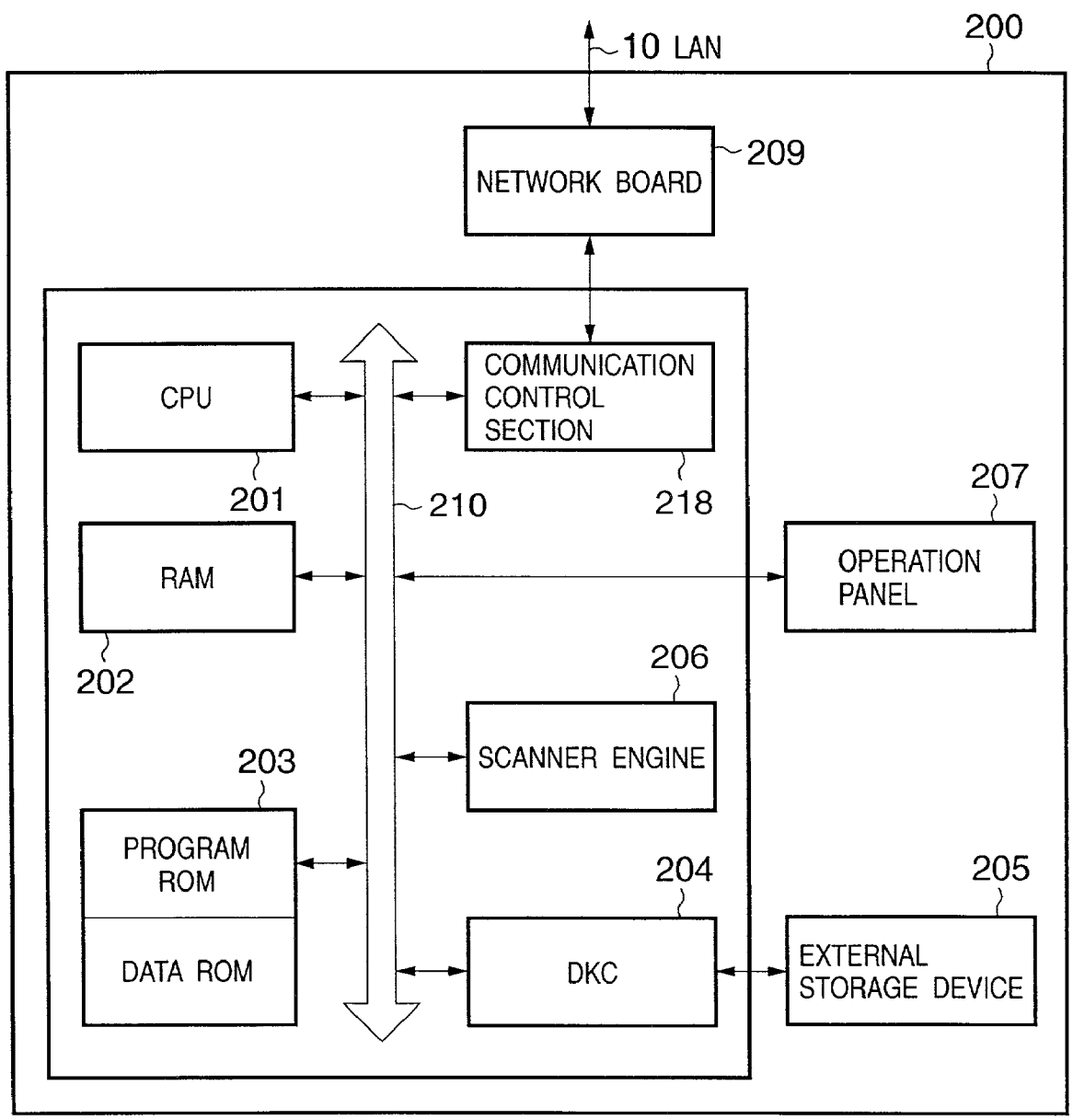
FIG. 2 is a block diagram for explaining the arrangement of an image scanner control system according to the first embodiment.

FIG. 2 is a block diagram for explaining the control system arrangement for the input device according to the first embodiment of the present invention. An image scanner will be exemplified here.

In an image scanner 200, a CPU 201 systematically controls accesses to various devices connected to a system bus 210 on the basis of a control program stored in the program ROM of a ROM 203 or a control program stored in an external storage device 205, and receives an image signal from a scanner engine 206 as input information. The program ROM of the ROM 203 stores a control program for the CPU 201, which is shown in a flow chart to be described later. If the image scanner has no external storage device 205 such as a hard disk or nonvolatile NVRAM, the data ROM of the ROM 203 stores setting information of the device.

A communication control section 218 can communicate with an external device such as a host computer through a network board 209 under the control of the CPU 201 and is designed to notify the host computer or the like of information in the image scanner.

A RAM 202 functioning as the main memory or work area of the CPU 201 is designed to expand its memory capacity using an optional RAM connected to an add-in port (not shown). The RAM 202 is used as an input image information conversion area or environmental data storage area. An access to the above-described external storage device 205 such as a hard disk (HD) or IC card is controlled by a disk controller (DKC) 204.

The external storage device 205 is optionally connected as an input image information storage area or to store an image conversion program. An operation panel 207 has operation switches and an LED display device.

Figure 3:
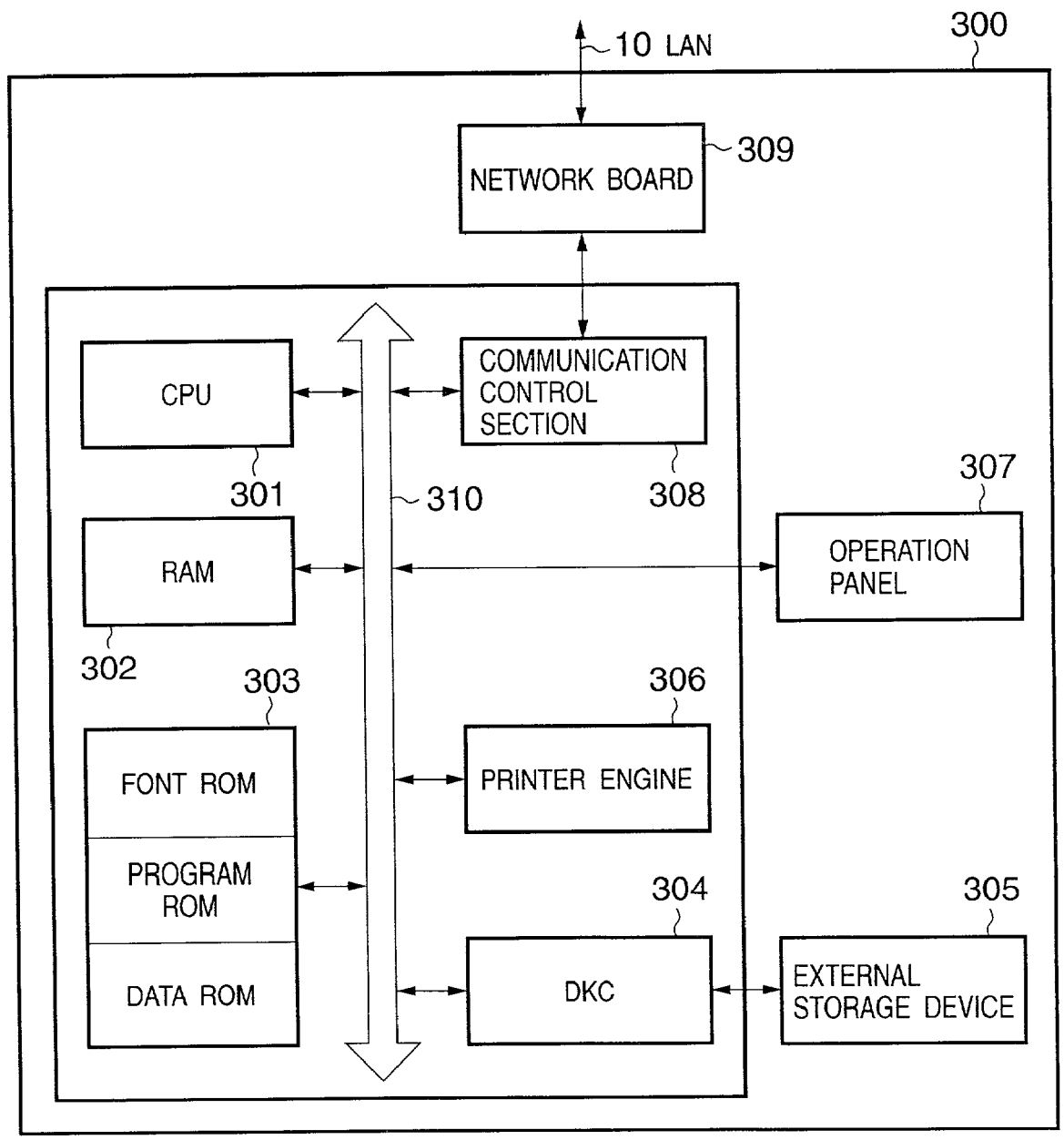
FIG. 3 is a block diagram for explaining the arrangement of a printer control system according to the first embodiment.

FIG. 3 is a block diagram for explaining the arrangement of a control system for an output device according to the first embodiment of the present invention. A laser beam printer will be exemplified here.

In the laser beam printer 300, a CPU 301 systematically controls accesses to various devices connected to a system bus 310 on the basis of a control program stored in the program ROM of a ROM 303 or a control program stored in an external storage device 305, and outputs an image signal from a printer engine 306 as output information. The program ROM of the ROM 303 stores a control program for the CPU 301, which is shown in a flow chart to be described later. If the printer has no external storage device 305 such as a hard disk, the data ROM of the ROM 303 stores setting information of the device.

A communication control section 308 can communicate with an external device such as a host computer through a network board 309 under the control of the CPU 301 and is designed to notify the host computer or the like of information in the printer.

A RAM 302 functioning as the main memory or work area of the CPU 301 is designed to expand its memory capacity using an optional RAM connected to an add-in port (not shown). The RAM 302 is used as an output image information bitmapping area, environmental data storage area, or NVRAM (NonVolatile Random Access Memory). An access to the above-described external storage device 305 such as a hard disk (HD) or IC card is controlled by a disk controller (DKC) 304. The external storage device 305 is optionally connected to store font data, emulation program, and form data. An operation panel 307 has operation switches and an LED display device.

The number of external storage devices described above is not limited to one. One or more external storage devices may be prepared, and a plurality of external storage devices each of which stores not only the internal font but also an optional font card or a program for interrupting a printer control language of another language system may be connected. In addition, an NVRAM (not shown) may be prepared to store printer mode setting information from the operation panel 307.

Figure 4:
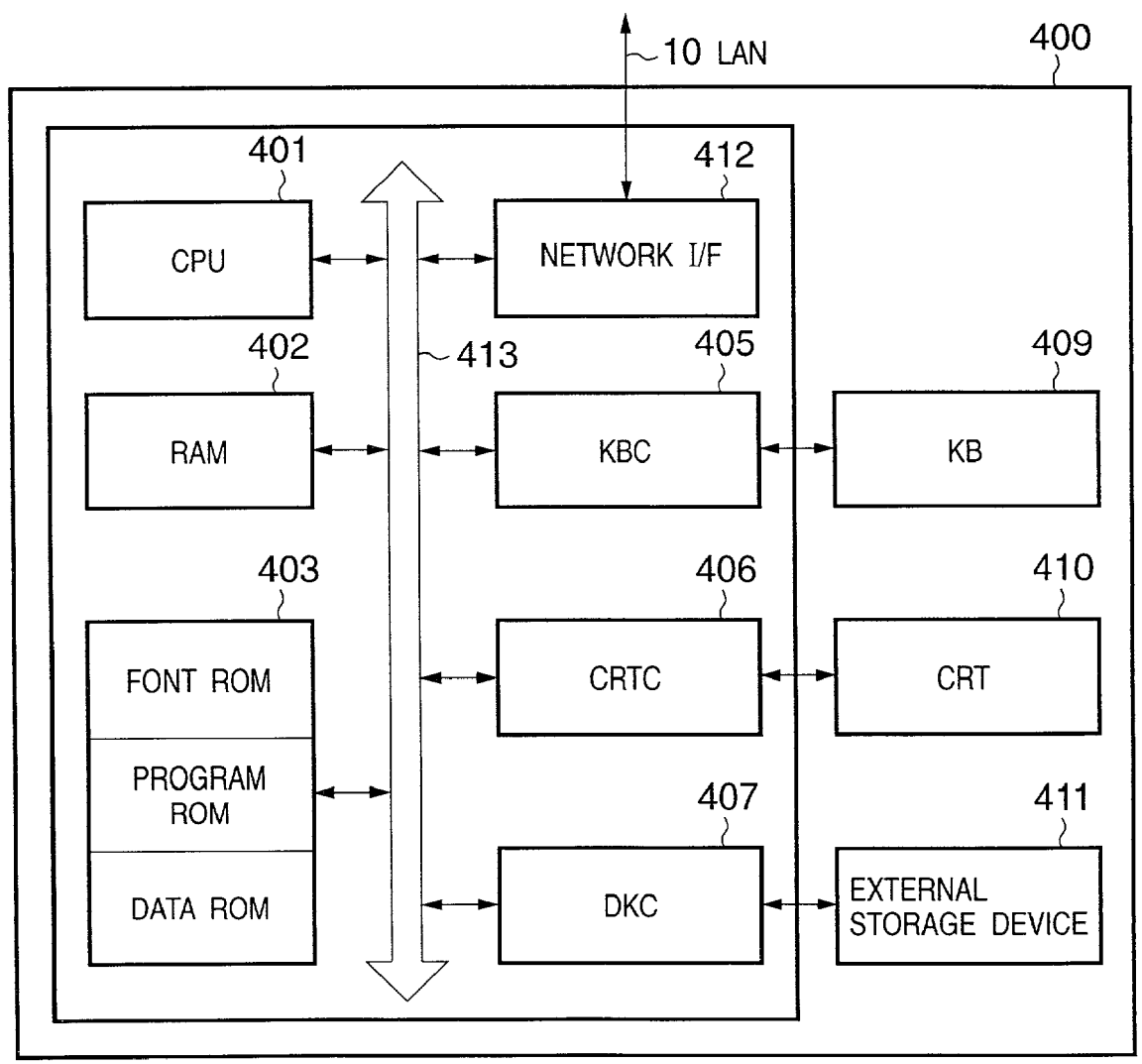
FIG. 4 is a block diagram for explaining the arrangement of a host computer control system according to the first embodiment.

FIG. 4 is a block diagram for explaining the control system arrangement for the host computer where a control program of the first embodiment of the present invention runs.

The host computer 400 has a CPU 401 which executes document processing for a document having graphic patterns, images, characters, and tables (including spreadsheets and the like) on the basis of a document processing program stored in the program ROM of a ROM 403. The CPU 401 systematically controls devices connected to a system bus 413.

Figure 11:
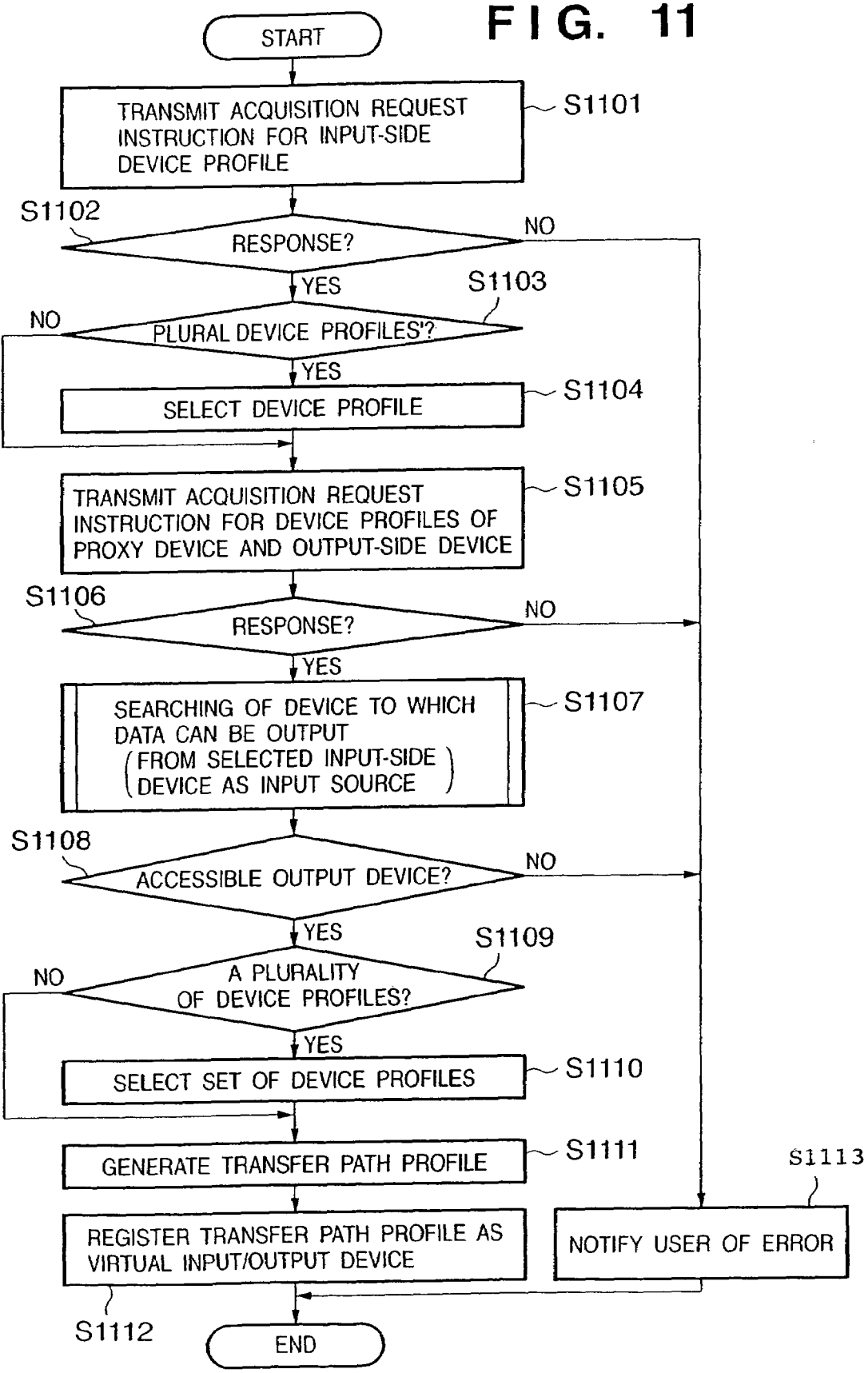
FIG. 11 is a flow chart showing logic input/output device definition processing of the first embodiment.

The program ROM of the ROM 403 stores a control program for the CPU 401, which is shown in the flow chart of FIG. 11. The font ROM of the ROM 403 stores font data used for the document processing. The data ROM of the ROM 403 stores various data (e.g., print information initial values and error message) used in the document processing.

A RAM 402 functions as the main memory or work area of the CPU 401.

A keyboard controller (KBC) 405 controls key input from a keyboard 409 or a pointing device (not shown).

A CRT controller (CRTC) 406 controls display on a CRT display (CRT) 410.

A disk controller (DKC) 407 controls an access to an external storage device 411 such as a hard disk (HD) or floppy disk (FD) which stores a boot program, various applications, font data, user files, and edit files.

A network interface 412 is connected to an input/output device such as the image scanner 200 or laser beam printer 300 through the network to execute communication control processing with each input/output device. Devices related to the network such as the LAN and other external devices connected are not illustrated in FIG. 4.

The CPU 401 executes, e.g., rasterizing of an outline font on the display information RAM set on the RAM 402 to allow WYSIWYG on the CRT 410 (data as is seen on the display device can be obtained: the final output form can be confirmed on the display device every time data is to be printed, data can be displayed on the display device with the final layout intended by the user, or displayed data can be output by the output device without any change in format). The CPU 401 also opens various registered windows on the basis of a command pointed by a mouse cursor (not shown) on the CRT 410 and executes various data processing operations.

Figure 5:
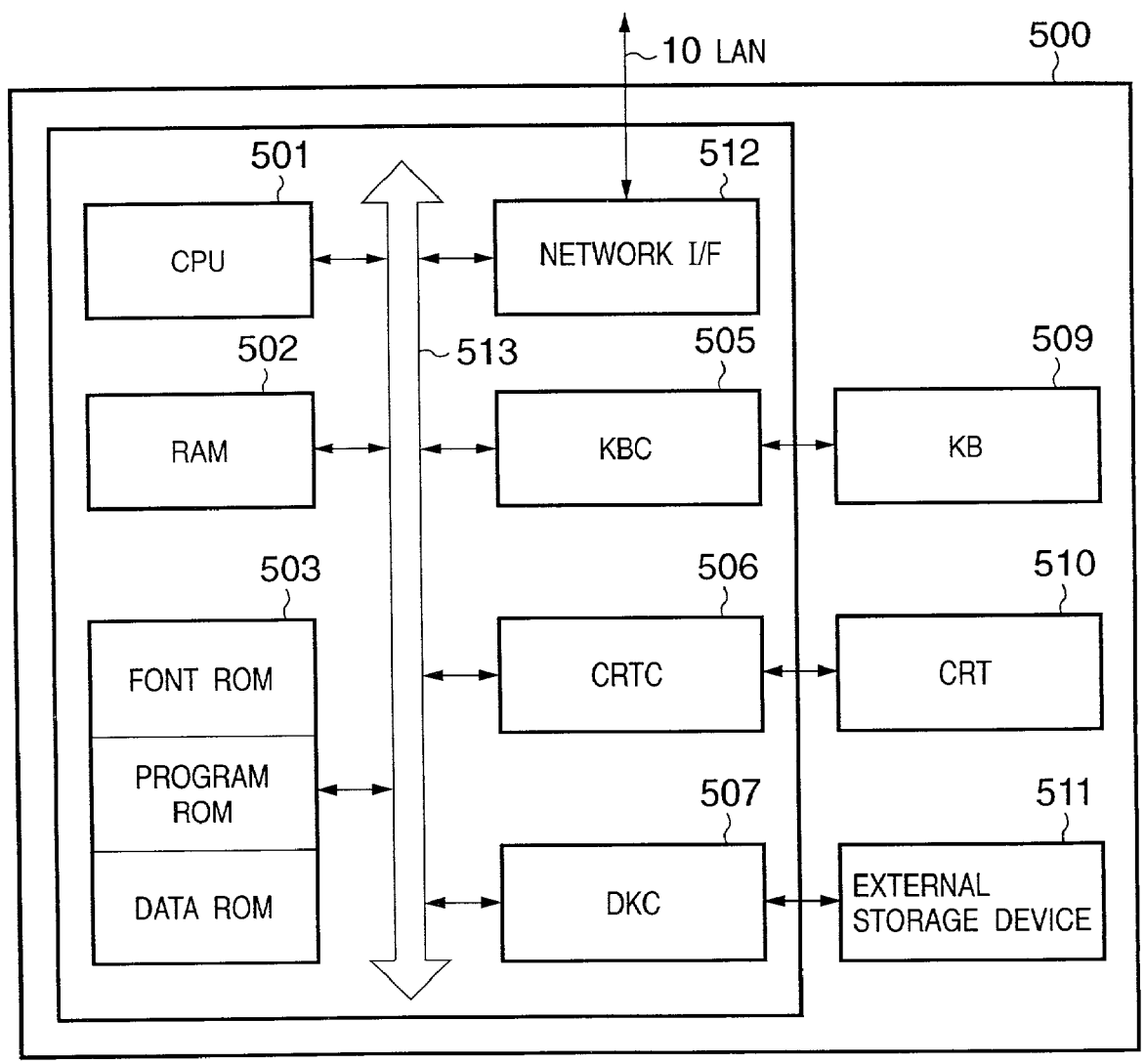
FIG. 5 is a block diagram for explaining the arrangement of a server control system according to the first embodiment.

FIG. 5 is a block diagram for explaining the control system arrangement for the server computer where a control program of the first embodiment of the present invention runs.

The server computer 500 has a CPU 501 which executes processing based on a processing program stored in the program ROM of a ROM 503. The CPU 501 systematically controls devices connected to a system bus 513.

The program ROM of the ROM 503 stores a control program for the CPU 501.

A RAM 502 functions as the main memory or work area of the CPU 501.

A keyboard controller (KBC) 505 controls key input from a keyboard 509 or a pointing device (not shown).

A CRT controller (CRTC) 506 controls display on a CRT display (CRT) 510.

A disk controller (DKC) 507 controls an access to an external storage device 511 such as a hard disk (HD) or floppy disk (FD) which stores a boot program, various applications, font data, user files, and edit files.

A network interface 512 is connected to an input/output device such as the image scanner 200 or laser beam printer 300 through the network to execute communication control processing with another host computer or each input/output device. Devices related to the network such as the LAN and other external devices connected are not illustrated in FIG. 5.

The CPU 501 manages accesses to files stored in the recording device 511 such as a hard disk.

As the first function of the server computer 500, it serves as a file server. More specifically, the server computer 500 serves as a file manager for managing transmission/reception, sharing, and storage of data in the host computer 400 or the like and queuing data to be transmitted to the printer server (storing data as a queue).

The server computer can manage various types of files. The server computer 500 of this embodiment collects and stores, through the network, pieces of device information (device profiles) of the input, output, and proxy devices (to be described later), information (transfer path profile) related to the data transfer path between the devices, and information (virtual device) related to a virtual input/output device system constituted by input and output devices defined by a transfer path profile.

As the second function, the server computer 500 of this embodiment functions as a database management system (DBMS) for collecting the pieces of configuration information of various devices and replying to an inquiry and serves as a configuration information server. In other words, the server computer works as a kind of directory server, name server, or lookup server which manages the profile information of various devices and responds to search. The function of this server can also be implemented using the DNS widely used in the Internet, or various directory services such as an LDAP, various naming services or interface repositories in the distributed computing technology or distributed object technology, or a Java/JINI lookup service by Sun.

The network board of each device can simultaneously use a plurality of network software programs to efficiently communicate with various host computers and can use, e.g., software such as NetWare (tradename of Novell) or UNIX (tradename of AT&T). The network board can also simultaneously use various network protocols used in these software programs and can use, e.g., TCP/IP or IPX/SPX.

Figure 6:
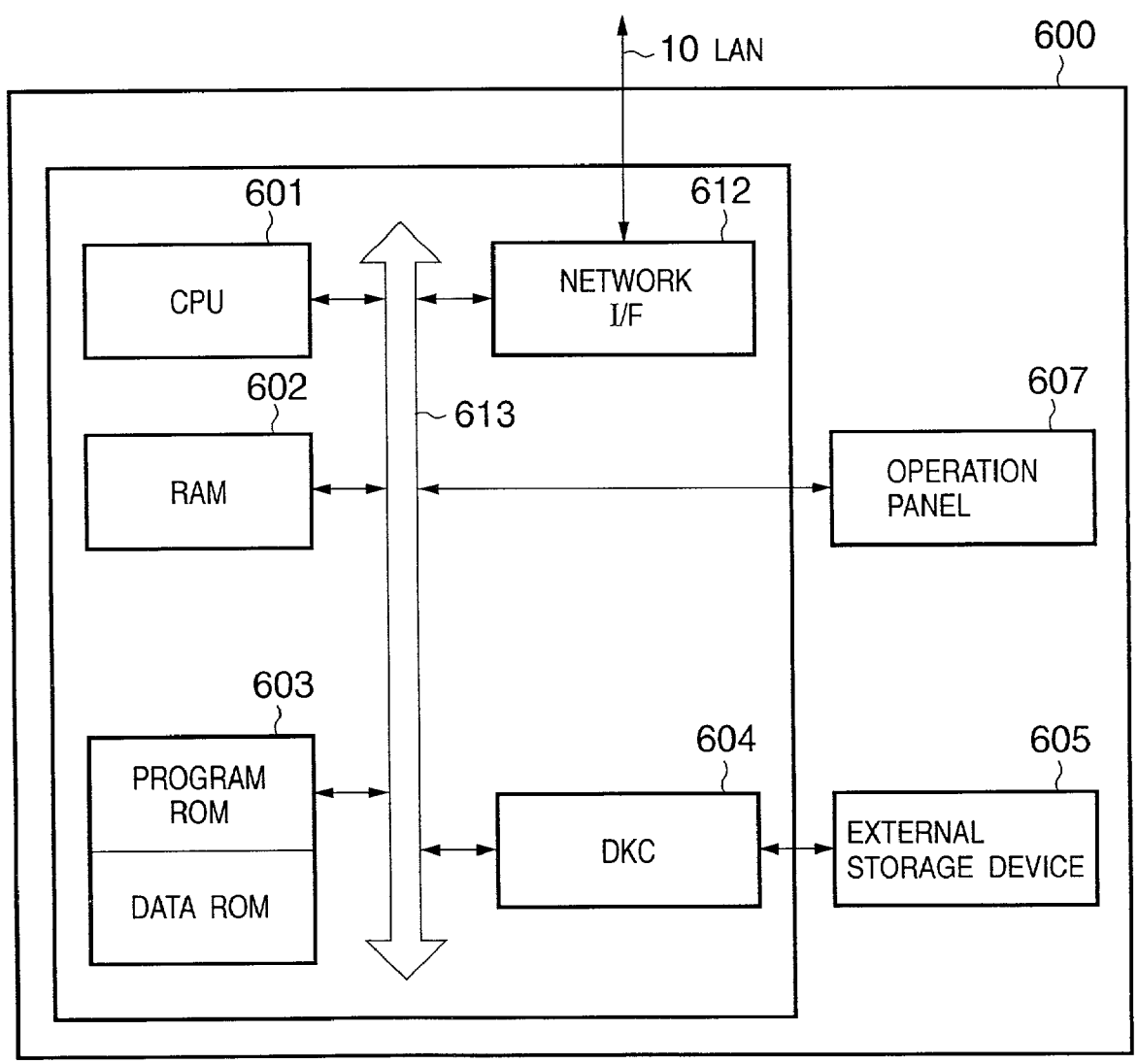
FIG. 6 is a block diagram for explaining the arrangement of a proxy device control system according to the first embodiment.

FIG. 6 is a block diagram for explaining the control system arrangement of a proxy device control system according to the first embodiment of the present invention.

In a proxy device 600, a CPU 601 systematically controls accesses to various devices connected to a system bus 613 on the basis of a control program stored in the program ROM of a ROM 603 or a control program stored in an external storage device 605. The program ROM of the ROM 603 stores a control program for the CPU 601, which is shown in a flow chart to be described later. If the proxy device has no external storage device 605 such as a hard disk or nonvolatile NVRAM, the data ROM of the ROM 603 stores setting information of the device.

A network interface 612 is connected to input and output devices such as the image scanner 200 and laser beam printer 300 through the network (devices related to the network such as the LAN and other external devices connected are not illustrated) to execute communication control processing with each input/output device.

A RAM 602 functioning as the main memory or work area of the CPU 601 is designed to expand its memory capacity using an optional RAM connected to an add-in port (not shown). The RAM 602 is used as an input image information temporary storage area or environmental data storage area.

An access to the above-described external storage device 605 such as a hard disk (HD) or IC card is controlled by a disk controller (DKC) 604. The external storage device 605 is optionally connected as an input image information storage area or to store an image conversion program.

An operation panel 607 has operation switches and an LED display device.

<Device Profile>

Device profiles that describe the device attributes of these devices and processing of causing each device to announce the device profile through the network will be described next.

FIG. 7 is a view showing device profile information according to the first embodiment, which describes the device attribute of an image scanner.

Device-Type represents the type of device, i.e., whether the device is an input device or output device, or a proxy device (filter) for performing transfer. The device type is described in more detail after a slash (/). In this example, "input-device/scanner" describes that the device is an input device and, more specifically, an image scanner.

Device-Id represents the identifier ("scan5") of the device.

Device-Address represents the network address of the device. In this case, IP address "172.16.10.2" is described assuming the TCP/IP network.

Transmission-Mode represents the supported transfer protocol and control direction. "FTP/Passive" described here means that the device having this device profile supports data transfer by FTP as a well-known file transfer protocol, and for data transfer control, this device passively performs data transfer under the control of a remote device in accordance with an instruction from the remote device. More specifically, the scanner of this example reads an original image using a transmission instruction from a remote device as a trigger, and transmits the read image data to the remote device as the transmission instruction source. An input device that starts such passive data transfer will be called a passive input device.

Resolution represents the data processing resolution. Referring to FIG. 7, it is described that an original image can be read as image data having a resolution of 1,200 dpi (dot per inch).

Data-Format represents the supported data format. In this example, three formats, i.e., JPEG, JIF, and LIPS IV are supported.

FIG. 8 is a view showing another device profile information according to the first embodiment, which describes the device information of a printer.

Device-Type represents the type of device, i.e., whether the device is an input device or output device, or a proxy device (filter) for performing transfer. The device type is described in more detail after a slash (/). In this example, "output-device/printer" describes that the device is an output device and, more specifically, a printer.

Device-Id represents the identifier (lp5-1) of the device.

Device-Address represents the network address of the device. In this case, IP address "172.16.10.5" is described assuming the TCP/IP network.

Transmission-Mode represents the supported transfer protocol and control direction. "LPD/Passive, FTP/Passive" described here means that the device having this device profile supports data transfer by the protocols FTP and LPD (LPS), and this device is passively controlled by a remote device in data transfer. More specifically, the printer of this example receives print data to be printed in accordance with a request issued from the data transmission source. An output device that passively waits for the start of data transfer will be called a passive output device.

Resolution represents the data processing resolution. In this example, it is described that input image data having a resolution of 600 dpi (dot per inch) can be received and printed.

Data-Format represents a supported data format. In this example, LIPS IV is supported.

FIG. 9 is a view showing still another device profile information according to the first embodiment, which describes the device information of a proxy device having an interface conversion function.

Device-Type represents the type of device, i.e., whether the device is an input device or output device, or a proxy device (filter) for performing transfer. The device type is described in more detail after a slash (/). In this example, "filter-device/conv" describes that the device is a proxy device and, more specifically, a filter device having an interface conversion function.

Device-Id represents the identifier (proxy0) of the device.

Device-Address represents the network address of the device. In this case, IP address "172.16.10.10" is described assuming the TCP/IP network.

The proxy device of filter-device/conv type has descriptions of reception and transmission interface conditions supported by the device.

Receive-Transmission-Mode represents the transfer protocol and control direction supported in the reception mode. "FTP/Passive, Active" described here means that the device having this device profile supports data reception by FTP as a well-known file transfer protocol, and either this device or a transmission source device can take the initiative in controlling data reception from the transmission source device.

Send-Transmission-Mode represents the transfer protocol and control direction supported in the transmission mode. "FTP/Passive, Active" described here means that the device having this device profile supports data transmission by FTP as a well-known file transfer protocol, and either this device or a transmission destination device can take the initiative in controlling data transfer.

Receive-Resolution represents the reception data resolution and that image data having a resolution of 1,200 dpi, 600 dpi, 400 dpi, or 300 dpi can be received and processed. Send-Resolution represents the transmission data resolution and that the device is capable of transmitting data while converting the resolution to 1,200 dpi, 600 dpi, 400 dpi, 300 dpi, or 100 dpi.

Receive-Data-Format represents the data format supported in the reception mode. In this example, JPEG is supported. Send-Data-Format represents the data format supported in the transmission mode. In this example, the device is capable of transmitting data while converting the data format to JPEG, GIF, or LIPS IV.

<Announcement of Profile>

Figure 10:
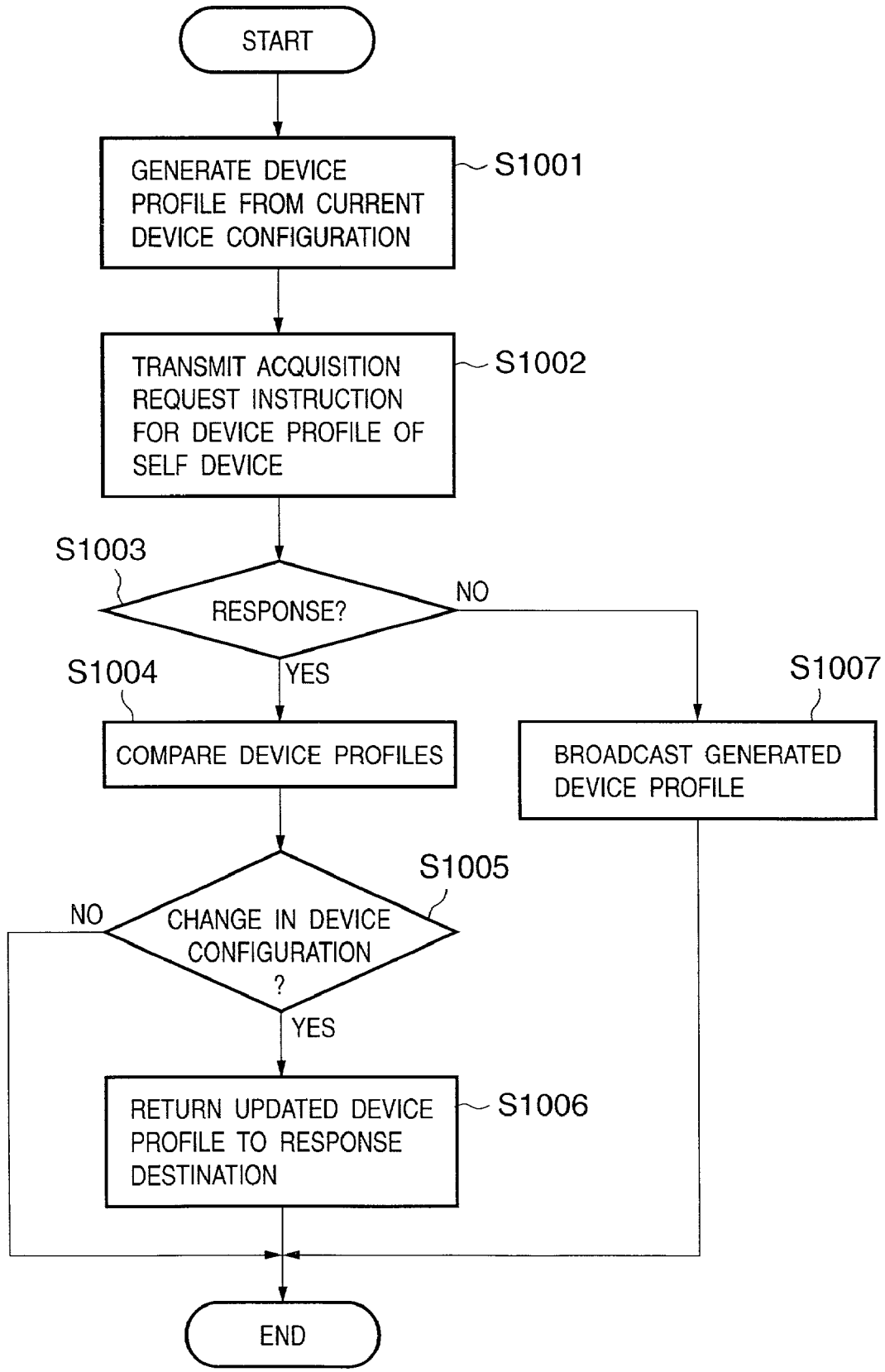
FIG. 10 is a flow chart showing processing of causing a device to announce device profile information to the network in the first embodiment.

FIG. 10 is a flow chart showing processing in the scanner (input device), printer (output device), or proxy device of this embodiment when the device information is to be announced to the network upon powering on the device or changing setting on the operation panel or the like. S1001 to S1007 represent steps. The control procedure is stored in each of the ROMs of the input device 200, output device 300, and proxy device 600.

In step S1001, a device profile containing information shown in FIG. 21 is generated in accordance with the current device configuration.

In step S1002, to confirm whether information of the previous change in setting is present on the network that manages profiles, an acquisition instruction for acquiring the device profile of its own is transmitted to the network. In step S1003, a response is waited for a predetermined period. Upon detecting a response, the flow advances to step S1004 to compare the device profile generated in step S1001 with the device profile as the response.

If it is determined in step S1005 that the contents of the device profile have been changed, the device profile generated in step S1001 is returned to the response source in step S1005, and the processing is ended.

If NO in step S1005, the processing is immediately ended.

If NO in step S1003, the device profile generated in step S1001 is broadcast to the network as new device information, and the processing is ended. The information transmitted to the network is received by the server computer 500 and stored in a recording device managed by the database function (DBMS).

<Transfer Profile>

A procedure of defining a transfer path for a combination of a plurality of distributed devices on the basis of device profiles and newly defining a virtual input/output device by the composite function of the combined devices will be described next.

FIG. 11 is a flow chart showing processing which is executed by the CPU 401 of the host computer 400 to determine the transfer scheme between the input and output devices in accordance with the device information of each of the input and output devices of the present invention and generate a virtual input/output device. S1101 to S1113 represent steps. The control procedure is stored in the ROM 403.

In step S1101, an acquisition instruction for acquiring the device profile of the input device is transmitted. In step S1102, a response is waited for a predetermined period. If the entire network system normally functions, the requested profile data is searched for from pieces of information stored in the database of the server computer 500, and a response is returned.

When the response is detected, it is determined in step S1103 whether a plurality of device profiles are returned as a response. If YES in step S1103, processing of causing the user to select an arbitrary device profile is executed in step S1104, and the selected device profile information is temporarily stored in the RAM 402 or the like. In step S1105, an acquisition instruction for acquiring the device profile of the output device is transmitted. The output device also includes a proxy device.

In step S1106, a response is waited for a predetermined period. When a response is detected, the flow advances to step S1107.

Figure 12:
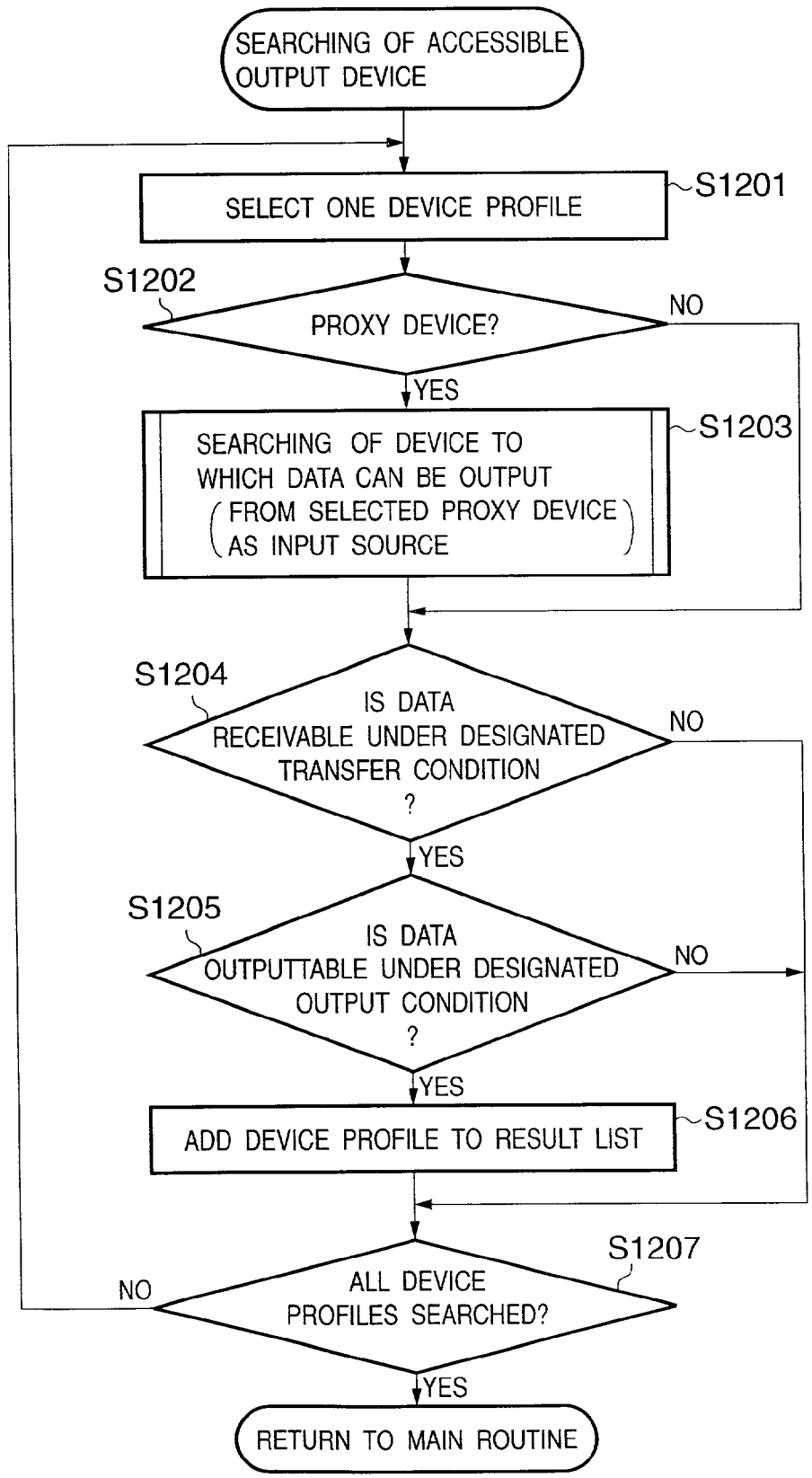
FIG. 12 is a flow chart showing output device selection processing of the first embodiment.

In accordance with the definition contents of the device profile of the input device, which is selected in step S1104, the device profile of an output device to which data can be output from the input device is searched for in step S1107. Search processing in step S1107 is shown in FIG. 12.

It is determined in step S1108 whether an accessible output device is present. If YES in step S1108, it is further determined in step S1109 whether a plurality of accessible output devices are present.

Figure 13:
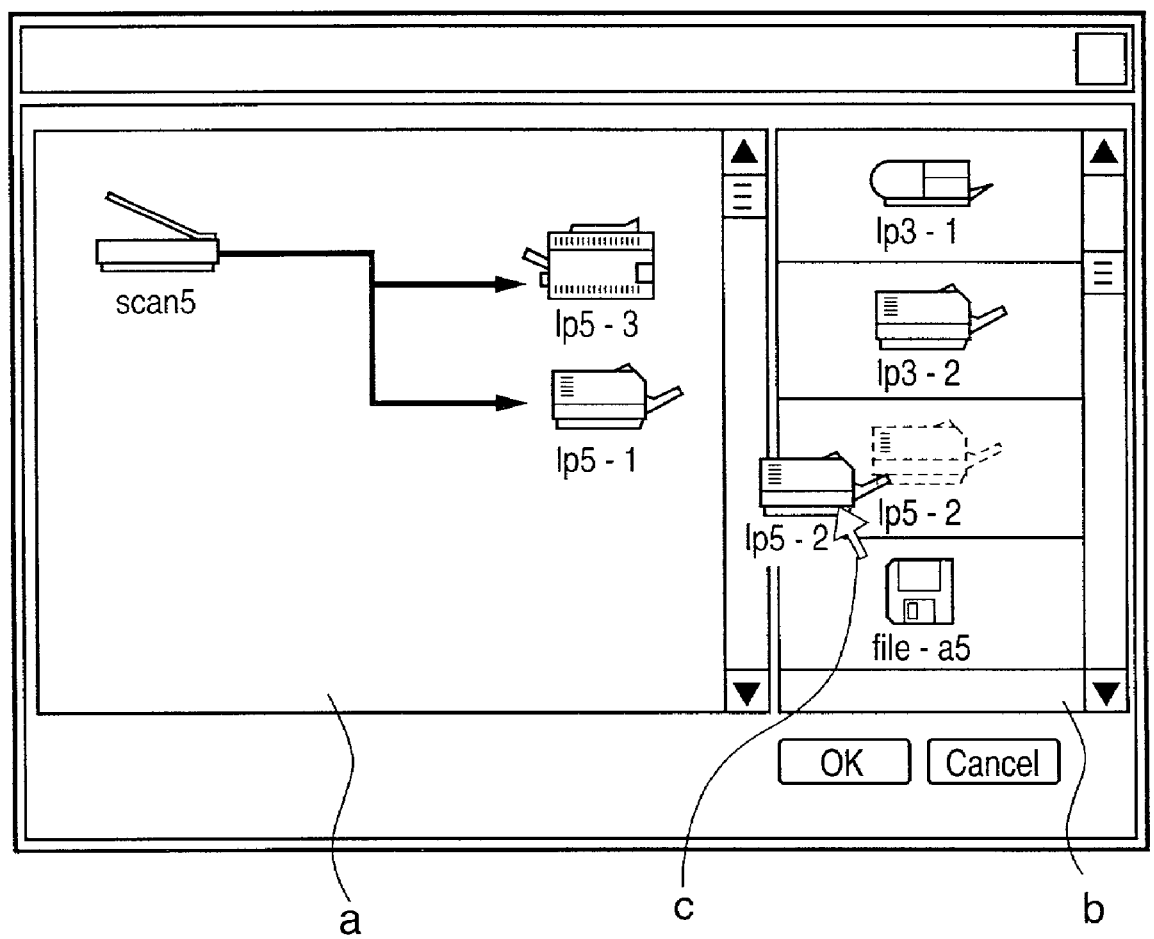
FIG. 13 is a view showing a user interface for defining a virtual input/output device in the first embodiment.

If YES in step S1109, the user is prompted to select a set of a plurality of output device profiles in step S1110. The user connects the input device and output device using a graphical user interface (GUI) as shown in FIG. 13, which is displayed on the CRT 410, thereby specifying the set of input and output devices.

As a consequence, in step S1111, a transfer path profile as shown in FIG. 14 is generated from the selected sets of output device profiles and the input device profile. When a proxy device for matching interfaces is intervened to connect the selected input and output devices, a transfer path profile with the proxy device inserted is generated.

In step S1112, the generated transfer path profile and preference unique to the user are combined into virtual input/output device information for defining a logic input/output device, transmitted, and stored in the recording device 511 of the server computer 500 as an area that can be referred to by the input or output device.

If NO in step S1102, S1106, or S1108, the user is notified of the error in step S1113, and the processing is ended.

In this example, a connectable transfer path is generated by searching in the direction of data transfer using the input device as a key. To quickly generate a transfer path that reaches a specific output device of interest, the same searching may be performed in an opposite direction from the downstream to the upstream of the transfer path.

FIG. 12 is a flow chart for explaining a subroutine corresponding to processing step S1107 of FIG. 11 where an accessible output device is searched for. In step S1107 of FIG. 11, the input-side device profile solely selected in step S1105 is given as an input source, the proxy and output device profile list acquired at this time is given as an output destination list, and the subroutine is called.

In step S1201, the first device is selected from the list of the profiles of the output devices (including proxy devices) given by the calling source.

It is determined in step S1202 whether the device is a proxy device. If NO in step S1202, the flow skips to step S1204.

It is determined in step S1204 whether the selected output device (excluding proxy devices) can receive data under the transfer condition from the given input source. If NO in step S1204 (i.e., no transfer path can be formed), the next processing is skipped, and the flow advances to S1207.

In step S1206, the selected output device profile is added to the execution result list of this subroutine. The addition processing to the list is done by the sum of sets, so even when the same elements are added several times, only different elements are present in the result list.

It is determined in step S1207 whether the output destination list given by the calling source is completely searched. If YES in step S1207, the flow returns to the main routine. If NO in step S1207, the flow returns to step S1201 to repeat the series of processing operations for all output destinations in the list.

If YES in step S1202, the flow advances to step S1203 to recursively call the subroutine. At this time, the selected proxy device is given as an input source, and the list of the profiles of the proxy devices and output-side devices given in calling the subroutine is given as an output destination list. By this recursive call, all output devices reachable through the proxy device can be added to the list.

An accessible output device means an output-side device at the transfer destination, whose interface condition in the reception mode matches the interface condition of the transmission source device of interest in the transmission mode, including the data resolution, data format, transfer protocol, and control direction. When the proxy device is located on the output side, matching is done for each attribute of the Receive system. When the proxy device is located on the input side, matching is done for each attribute of the Send system.

As a rule for matching the control direction, Active and Passive or Passive and Active of the same protocol match. Active devices or Passive devices do not match and cannot be connected. To connect an Active transmitting side and Passive receiving side, Source, i.e., transmitting side is set to the value of Transmission-Trigger attribute of a corresponding path of the generated transfer path profile. To connect a Passive transmitting side and Active receiving side, Destination, i.e., transmitting side is set to the value of Transmission-Trigger attribute of a corresponding path of the generated transfer path profile.

FIG. 13 shows a graphical user interface (GUI) displayed on the CRT 410, on which the input device and one or more output devices are connected to define one virtual input/output device.

A plurality of output devices detected in step S1109 of FIG. 11 are listed at a window portion b shown in FIG. 13.

The user selects a desired one (lp5-2) of icons representing the output devices with a cursor c and drags it to a portion a. Then, an arrowheaded line which connects the dragged icon to the icon (scan5) representing the input device displayed in the portion a is automatically displayed.

The user repeats the above processing until all desired output devices are arranged. When the processing is ended, the user clicks the mouse on the OK button at the lower portion of the window. A directed graph from the input device to one or more output devices arranged in the portion a at this time is logically generated, and these combinations constitute virtual input/output devices.

The set of device profiles corresponding to the output devices included here is the selection result in step S1110 of FIG. 11.

FIG. 14 shows a transfer path profile according to this embodiment. Note that in the transfer path profile of this example, the description order of lines is meaningful.

Path-Set attribute describes a path for connecting devices by a set of device IDs and also describes a plurality of paths as a list.

Input-Device is the value of Device-id defined by the device profile of the input device included in the path. Input-Address is the network address of the input device.

Filter-Device is the value of Device-id defined by the device profile of the proxy device included in the path. Filter-Address is the network address of the proxy device.

The next four lines represent interface parameters for data transfer from the input device to the proxy device.

Transmission-Mode represents the protocol for data transfer, and FTP is used. Transmission-Trigger describes whether the device that takes the initiative in data transfer is the transmission source or reception destination of transfer and represents the control direction of data transfer. In this example, the receiving side, i.e., the proxy device actively activates data transfer and acquires data from the input device, and the input device passively transfers the requested data. Resolution represents the data resolution for transfer, which is 1,200 dpi in this example. Data-Format represents the data format for transfer, which is JPEG in this example.

Output-Device is the value of Device-id defined by the device profile of the output device included in the path. Output-Address is the network address of the output device.

The next four lines represent interface parameters for data transfer from the proxy device to the output device.

Transmission-Mode represents the protocol for data transfer, and LPD is used. Transmission-Trigger describes whether the device that takes the initiative in data transfer is the transmission source or reception destination of transfer and represents the control direction of data transfer. In this example, the transmitting side, i.e., the proxy device actively activates data transfer and performs data transmission from the proxy device, and the output device passively processes the received data.

Resolution represents the data resolution for transfer, which is 600 dpi in this example. Data-Format represents the data format for transfer, which is LIPS IV in this example.

Hence, in data transfer using this transfer path profile, the proxy device of this example performs resolution conversion to receive data at 1,200 dpi and transmit it at 600 dpi and data format conversion to receive data in JPEG and transmit it in LIPS IV. The proxy device also converts the transfer protocol from FTP to LPD.

FIG. 15 is a view showing virtual input/output device information according to this embodiment.

Transmission-Profile: This attribute represents a transfer path profile of the virtual input/output device. In this example, the transfer path profile shown in FIG. 14 is used, as is apparent from its value.

User-Profile: This attribute represents the identifier to a data structure in which set values unique to each user are collected.

Display-Comment: This attributes describes a comment that assists identification in displaying this virtual input/output device information on the GUI of the host computer or the operation panel of the device.

Operation of a distributed system for actually transferring data from an input device to an output device will be described next.

Figures 16A, 16B:
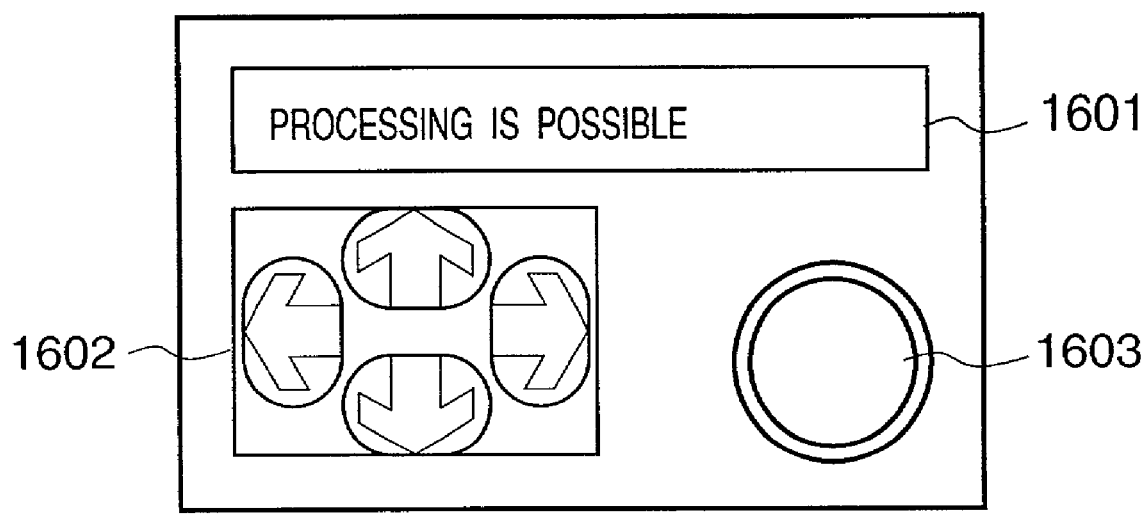
FIGS. 16A and 16B are views showing a user interface for operating the virtual input/output device in the first embodiment.

FIG. 16A is a view showing the outer appearance of the operation panel 607 of the proxy device 600. The user sets an original on the image scanner 200 and then operates the operation panel 607 of the proxy device 600 to activate a logic virtual input/output device distributed to the network. Referring to FIG. 16A, a liquid crystal panel 1601 can display 12 characters. Cursor keys 1602 are used to select functions. An execute button 1603 is pressed to instruct to start processing operation.

When the liquid crystal panel 1601 indicates the idle state of the device (FIG. 16A), the user can start selecting a virtual input/output device by pressing the right key of the cursor panel 1602.

FIG. 16B shows contents displayed on the liquid crystal panel 1601 when the right key of the cursor panel 1602 is pressed once. The character string on the liquid crystal panel is the same as that described in Display-Comment: shown in FIG. 15. As is apparent from this display, this virtual input/output device has been selected. When a plurality of pieces of virtual input/output device information are registered, another virtual input/output device information can be selected by further pressing the right key of the cursor panel 1602.

When the execute button 1603 is pressed, a network distributed copy function using the virtual input/output device is executed. According to the virtual input/output device information shown in FIG. 15, for example, the transfer path profile shown in FIG. 14 is used, as is apparent from the value of Transmission-Profile attribute.

<Virtual Copying Machine Using Combination of Passive Devices>

Figure 17:
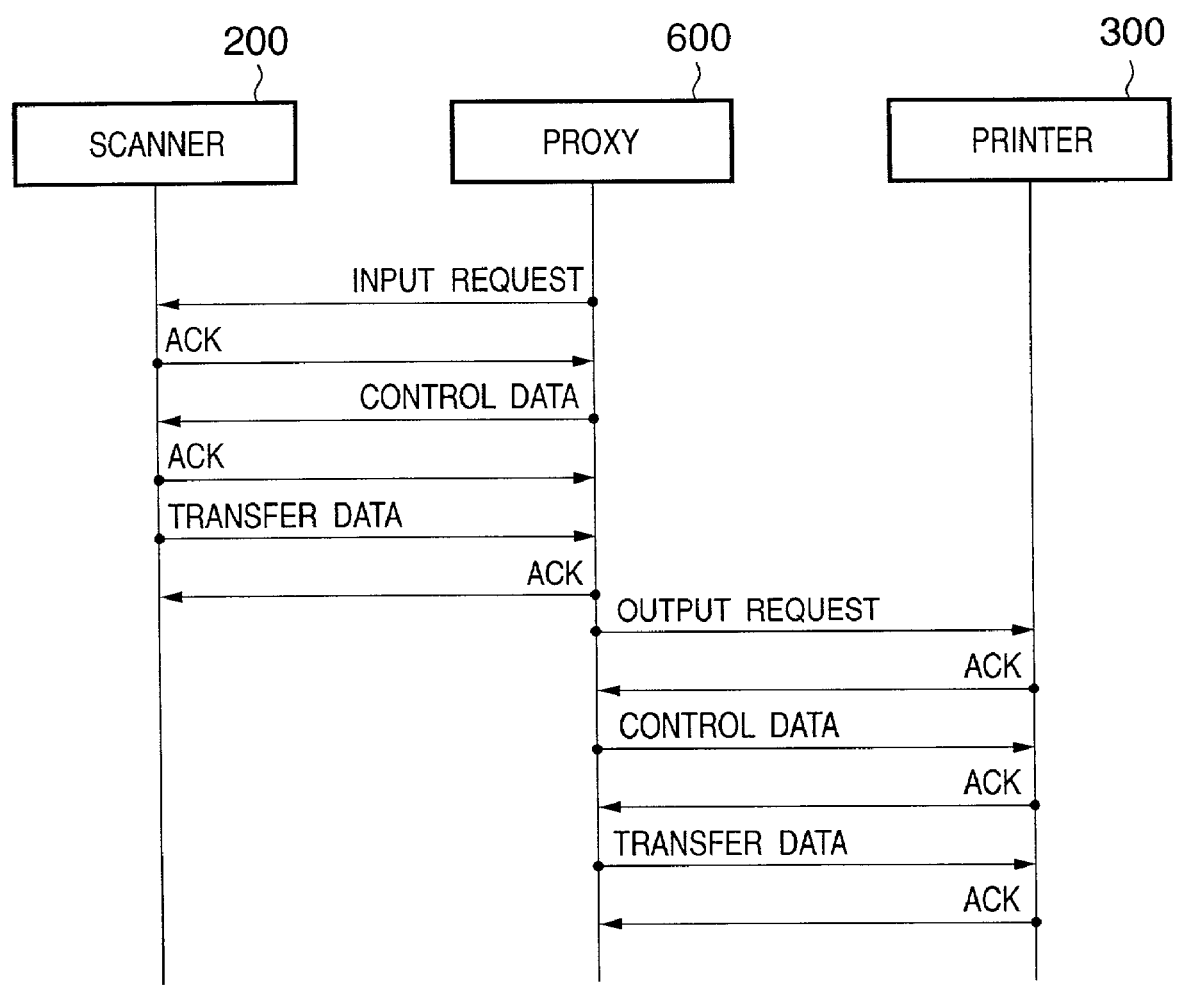
FIG. 17 is a view showing communication between the passive input device and the passive output device through the proxy device in the first embodiment.

FIG. 17 is a view showing the intercommunication procedure between devices when a remote copy function is implemented by transferring data from the input device to the output device through the proxy device in accordance with the virtual input/output device information of this embodiment.

When the virtual input/output device activated by user operation on the operation panel of the proxy device 600 implements a remote copy function constituted by the transfer path from the scanner 200 to the printer 300 through the proxy device 600, the proxy device outputs a connection request containing virtual input/output device information to the scanner (input request).

When the input request is received, the proxy device transmits control parameters and sync signal for transfer to the scanner (control data). Negotiation for the interface condition for transfer can be done at this time. However, without any negotiation, the scanner can acquire parameters for transfer by searching for the transfer path information shown in FIG. 14 on the basis of the virtual input/output device information designated to the scanner by the proxy device in sending the input request.

When the control data are received, the scanner transmits original image data read by the scanner engine to the proxy device (transfer data).

The proxy device receives the transfer data from the scanner and then outputs a connection request containing the virtual input/output device information to the printer (output request).

When the output request is received, the proxy device transmits control parameters and sync signal for transfer to the printer (control data). Negotiation for the interface condition for transfer can be done at this time. However, without any negotiation, the printer can acquire parameters for transfer by searching for the transfer path information based on the virtual input/output device information designated to the printer by the proxy device in sending the output request.

When the control data are received, the proxy device transmits the data received from the scanner to the printer (transfer data).

When the transfer data is received by the printer, logic copy operation by the multiple function device using the combination of devices distributed to the network is ended.

<Operation of Scanner in Virtual Copying Machine Using Combination of Passive Devices>

Figure 18:
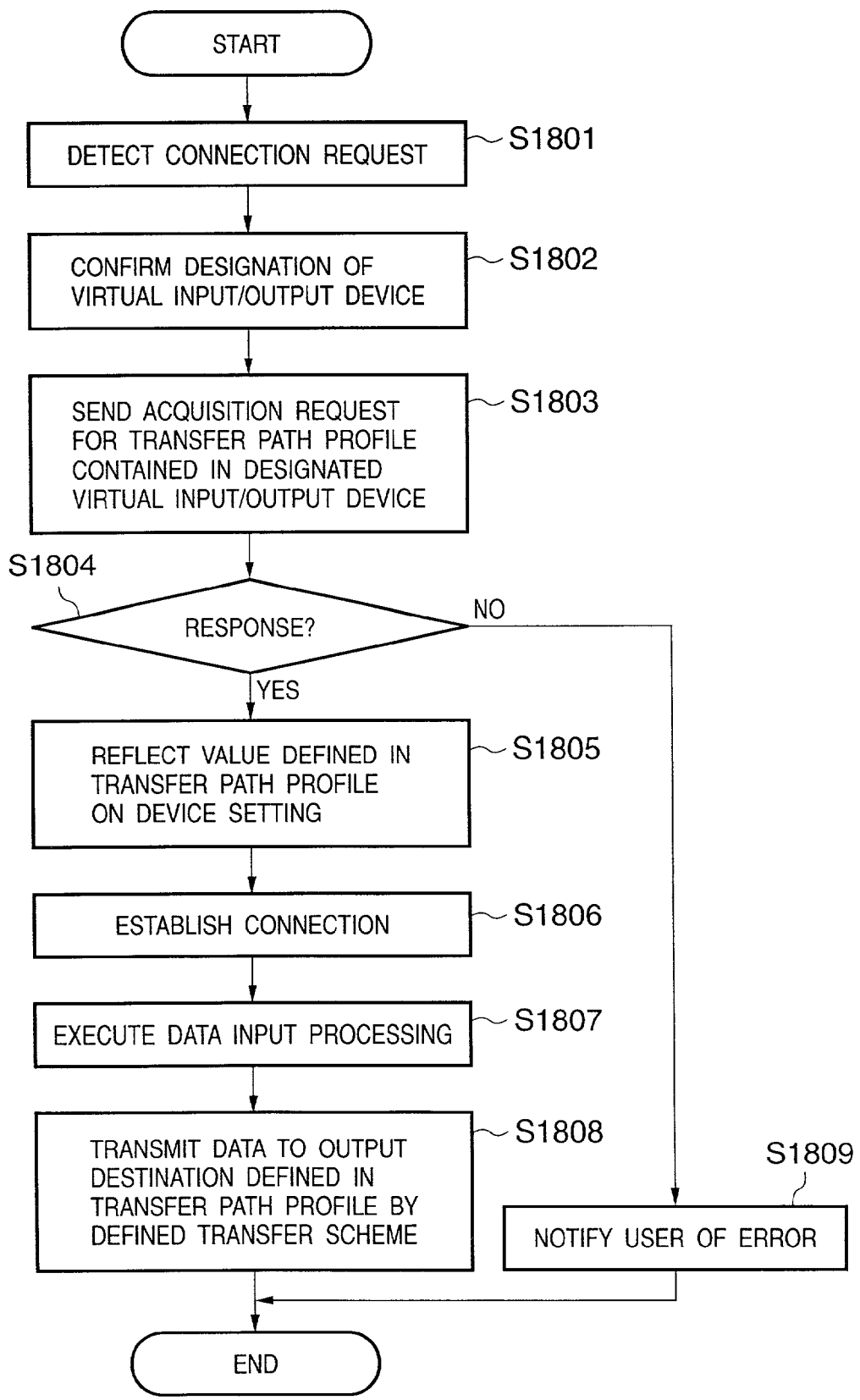
FIG. 18 is a flow chart showing the flow of processing of causing the passive input device to transmit data to the output destination in the first embodiment.

FIG. 18 is a flow chart showing processing of causing the scanner as a passive input device in this embodiment to transmit output data to the output destination, i.e., the output device or proxy device in accordance with the virtual input/output device information. S1801 to S1809 represent steps. The control procedure is stored in the ROM 203 of the scanner 200.

Processing waits until a connection request for setting the input device as an input source is output from the printer 300 or proxy device 600 in step S1801. When the connection request is detected, virtual input/output device information contained in the connection request is confirmed in step S1802. In step S1803, transfer path information (FIG. 14) acquisition request is transmitted to the server 500 to search for the transfer path information corresponding to the virtual input/output device information contained in the connection request.

In step S1804, a response is waited for a predetermined period. Upon detecting a response, the transfer path profile is reflected on the operation setting for the input device in step S1805 such that scan operation matching the transfer parameters described in the transfer path information is performed.

In step S1806, connection corresponding to the connection request is established. In step S1807, data input processing is executed by the scanner engine 206.

In step S1808, the input data is transferred to the device at the output destination defined in the transfer path profile in accordance with the transfer scheme defined in the transfer path profile.

If NO in step S1804, the user is notified of the error in step S1809, and the processing is ended.

<Operation of Proxy Device in Virtual Copying Machine Using Combination of Passive Devices>

Figure 19:
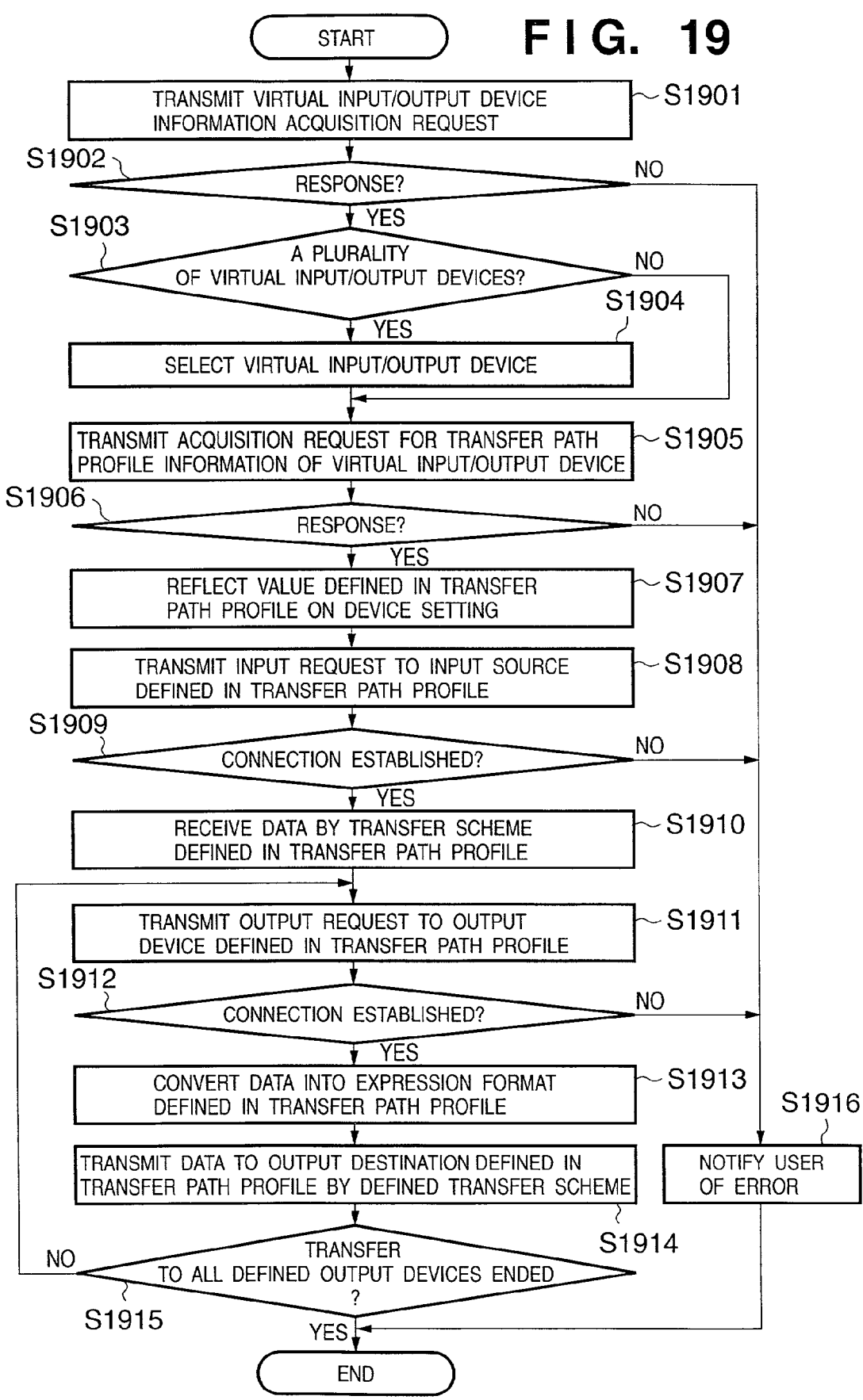
FIG. 19 is a flow chart showing relay processing by the proxy device for connecting active devices in the first embodiment.

FIG. 19 is a flow chart showing processing of causing the proxy device to transfer data received from the input device as an input source to the output device in accordance with the virtual input/output device information. S1901 to S1916 represent steps. The control procedure is stored in the ROM 603 of the proxy device 600.

When the user presses the right key of the cursor panel 1602 on the operation panel 607 of the proxy device 600, a virtual input/output device information acquisition request is transmitted to the server 500 in step S1901 to search for virtual input/output device information in which the proxy device is defined as the proxy device of the transfer path profile.

In step S1902, a response is waited for a predetermined period. Upon detecting a response, it is determined in step S1903 whether there are a plurality of pieces of responded virtual input/output device information. If YES in step S1903, the pieces of virtual input/output device information are displayed on the liquid crystal panel 1601 of the operation panel to make the user select an arbitrary virtual input/output device in step S1904.

In step S1905, an instruction is transmitted to acquire transfer path profile information related to the selected virtual input/output device, e.g., pieces of information corresponding to the attributes shown in FIG. 14.

In step S1906, a response is waited for a predetermined period. Upon detecting a response, setting for data reception is done in step S1907 to receive data in accordance with transfer parameters (i.e., the resolution, data format, and the like) from the input device to the proxy device, which are described in the transfer path information. In step S1908, a connection request containing the virtual input/output information is output to the input device described in the transfer path profile.

It is determined in step S1909 whether connection to the input source is established. If YES in step S1909, transfer data from the input device is received in accordance with the transfer parameters described in the transfer path information and stored in the storage device 605 in step S1910.

In step S1911, a connection request containing the virtual input/output device information is output to the output destination as the output device defined in the transfer path profile.

It is determined in step S1912 whether connection to the output destination is established. If YES in step S1912, transfer data is converted in accordance with the transfer parameters such as the resolution and format for data transfer to the output device defined in the transfer path profile in step S1913. In step S1914, the transfer data is transmitted to one of the output devices or proxy devices defined in the transfer path profile in accordance with the transfer scheme defined in the transfer path profile.

It is confirmed in step S1915 whether data transfer processing to all output destinations defined in the transfer path profile is ended. If NO in step S1915, the flow returns to step S1911 to repeat the data transfer processing until the processing for all output destinations is ended, and the processing is ended.

If NO in step S1904, S1906, S1909, or S1912, the user is notified of the error in step S1916, and the processing is ended.

<Operation of Printer in Virtual Copying Machine Using Combination of Passive Devices>

Figure 20:
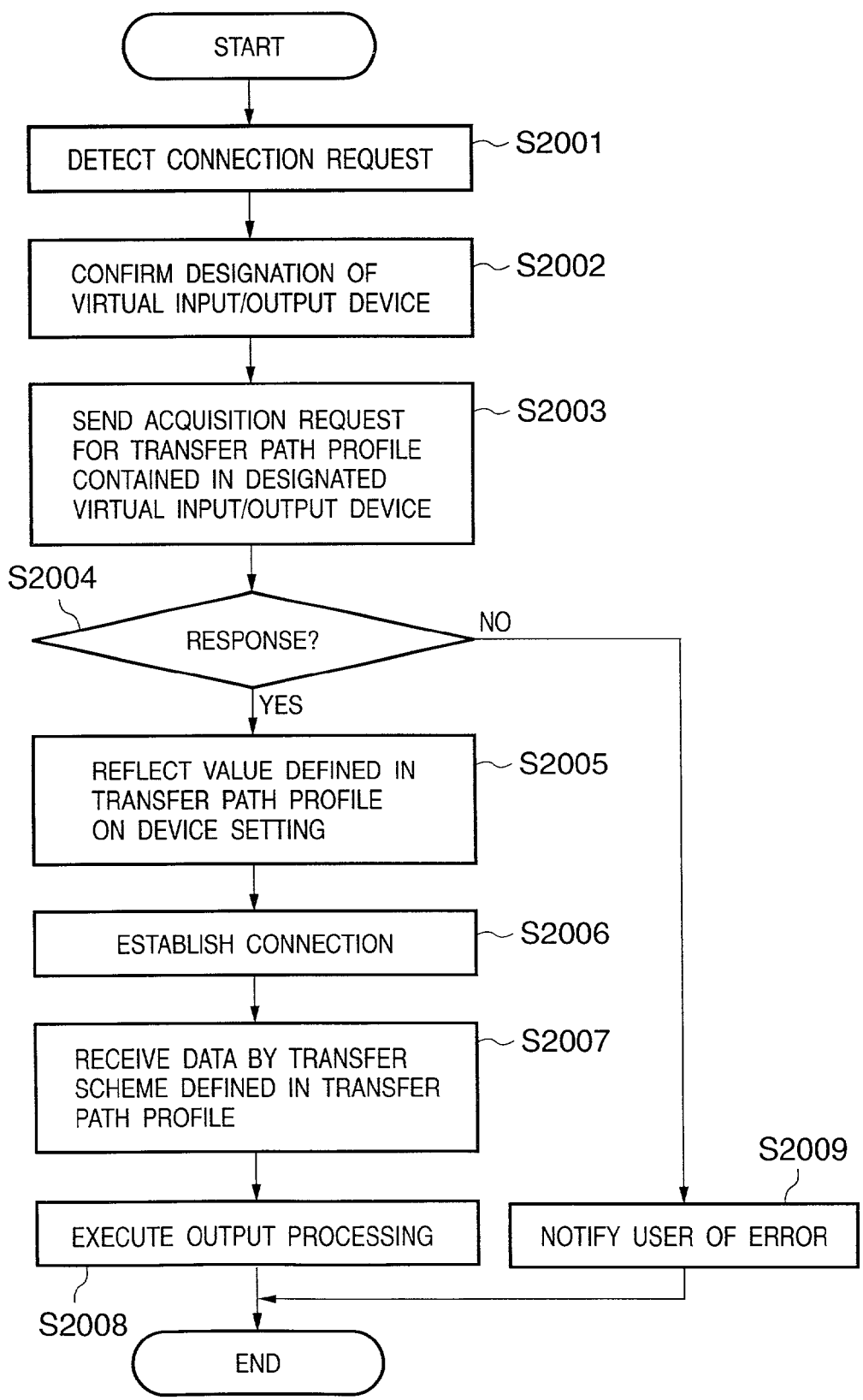
FIG. 20 is a flow chart showing the flow of processing of causing the passive output device to receive data from the input source.

FIG. 20 is a flow chart showing the flow of processing of causing the printer as a passive output device of this embodiment to receive data from the input source. S2001 to S2009 represent steps. The control procedure is stored in the ROM 303 of the printer 300.

In step S2001, the processing waits until a connection request is sent from the proxy device 600 or the like to the printer as an output destination.

When the connection request is received, designation of the virtual input/output device is confirmed in step S2002. In step S2003, a transfer path information (FIG. 14) acquisition request is transmitted to the server 500 to search for transfer path information corresponding to the virtual input/output device information contained in the connection request.

In step S2004, a response is waited for a predetermined period. Upon detecting a response, setting for data reception is done in step S2005 to receive data in accordance with the transfer parameters (i.e., the resolution, data format, and the like) from the proxy device to the printer, which are described in the transfer path information. In step S2006, connection to the proxy device as a connection source is established. In step S2007, transfer data from the proxy device is received in accordance with the transfer parameters described in the transfer path information.

In step S2008, the received data is printed by the printer engine. When the data is completely printed, the processing is ended.

If NO in step S2004, the user is notified of the error in step S2009, and the processing is ended.

In this embodiment, the input device, output device, and proxy device form independent network nodes. However, some of the functions of the devices may be arranged in one network node, i.e., device. In this case, the function of executing transfer to an output device together with data format matching for another input device may be provided in an input device or output device. The server computer may have the function of the proxy device.

In this embodiment, the server 500 stores the device profile, transfer path profile, user profile, and virtual input/output device definition information. When the server 500 is not present, the input or output device that receives a device profile acquisition request may directly notify the request source of the current configuration information by itself. The transfer path profile and virtual input/output device definition may also be stored in the recording device of the host computer, which has generated these pieces of information, and transmitted to the input or output device in accordance with a request from the input or output device. Alternatively, after the transfer path profile and virtual input/output device definition are generated, they may be transmitted to the input and output devices as an input source and output destination and stored in the storage devices of the input and output devices such that the information can be acquired from these devices.

In this embodiment, the device profile, transfer path profile, user profile, and virtual input/output device definition information are generated by the host computer. However, the profiles may be generated by the server, input device, output device, or proxy device.

In this embodiment, the device profile, transfer path profile, user profile, and virtual input/output device definition information are generated and stored in the server in advance. However, the profiles may be dynamically generated in real time when virtual input and output devices are selected in the devices.

As described above, according to this embodiment, in a distributed system in which when the proxy device relays data transfer, the master-slave relationship of data transfer control is adjusted to combine devices such as a scanner and printer distributed to the network in accordance with a transfer path profile, thereby implementing a composite function such as remote copy, the transfer path profile for combining input and output devices designed to be passively controlled (i.e., conventional devices) can be defined, and the flexibility in combination improves.

According to this embodiment, since the host computer need not involve in operation of a virtual input/output device with data transfer, a distributed system can be built without preparing any expensive host computer having a CPU and memory resources for high-speed processing of large-capacity image data.

According to this embodiment, to detect a set of combinable devices, the proxy device is inserted, and not only the input and output devices but also the proxy device announces its device configuration information to the network as a device profile. Since the system almost automatically searches for a transfer path and forms a transfer path profile on the basis of the device profiles, possible combinations transparent to the user are dynamically formed. Hence, the user can use a distributed system formed from a number of combinations without any cumbersome operation.

In this embodiment, a scanner is used as an input device, and a printer is used as an output device. However, any other device can be used as long as it can input or output an image. For example, a facsimile receiver, document processor, or a general-purpose computer can be used as an input device, and a facsimile transmitter or electronic filing device can be used as an output device.

Not only image data but data of any other format can be input or output as long as it is finally output as an image. For example, data called document data which has a format processed by a document processor or document processing application can be used as input/output data. Image data can have various formats, and any format can be used.

[Second Embodiment]

The second embodiment of the present invention will be described below. The same reference numerals as in the first embodiment denote the same components in the second embodiment, and a detailed description thereof will be omitted.

The network system of this embodiment has the arrangement shown in FIG. 1. In this embodiment, a printer 300 is a printer having a so-called pull printer function as an active output device. A scanner 200 is a so-called push scanner as an active input device. This system combines these devices to implement a virtual copying machine distributed to the network.

<Device Profile>

FIG. 21 is a view showing device profile information according to the second embodiment, which describes the device information of the image scanner.

Device-Type represents the type of device, i.e., whether the device is an input device or output device, or a proxy device (filter) for performing transfer. The device type is described in more detail after a slash (/). In this example, "input-device/scanner" describes that the device is an input device and, more specifically, an image scanner.

Device-Id represents the identifier (scan5) of the device.

Device-Address represents the network address of the device. In this case, IP address "172.16.10.2" is described assuming the TCP/IP network.

Transmission-Mode represents the supported transfer protocol and control direction. "FTP/Active" described here means that the device having this device profile supports data transfer by FTP as a well-known file transfer protocol, and this device has the initiative in data transfer control. More specifically, the scanner of this example reads an original image using user operation on the operation panel of the scanner device as a trigger and transfers the read image data to another device as an output destination in accordance with a request issued from the scanner device. An input device that starts such active data transfer will be called an active input device.

Resolution represents the data processing resolution. In this example, it is described that an original image can be read as image data having a resolution of 1,200 dpi (dot per inch).

Data-Format represents the supported data format. In this example, JPEG, JIF, and LIPS IV are supported.

FIG. 22 is a view showing another device profile information according to the second embodiment, which describes the device information of a printer.

Device-Type represents the type of device, i.e., whether the device is an input device or output device, or a proxy device (filter) for performing transfer. The device type is described in more detail after a slash (/). In this example, "output-device/printer" describes that the device is an output device and, more specifically, a printer.

Device-Id represents the identifier (lp5-1) of the device.

Device-Address represents the network address of the device. In this case, IP address "172.16.10.5" is described assuming the TCP/IP network.

Transmission-Mode represents the supported transfer protocol and control direction. "FTP/Active" described here defines that the device having this device profile supports data transfer by the protocol FTP, and this device actively controls a remote device in data transfer to acquire data. More specifically, the printer of this example issues a data transfer request to a data transmission source and receives print data to be printed. An output device that actively starts data transfer will be called an active output device. Such print operation will be especially called pull printing.

Resolution represents the data processing resolution. In this example, it is described that input image data having a resolution of 600 dpi (dot per inch) can be received and printed.

Data-Format represents a supported data format. In this example, LIPS IV is supported.

<Transfer Path Profile>

FIG. 23 shows a transfer path profile according to this embodiment. Note that in the transfer path profile of this example, the description order of lines is meaningful.

Path-Set attribute describes a path for connecting devices by a set of device IDs and also describes a plurality of paths as a list.

Input-Device is the value of Device-id defined by the device profile of the input device included in the path. Input-Address is the network address of the input device.

Filter-Device is the value of Device-id defined by the device profile of the proxy device included in the path. Filter-Address is the network address of the proxy device.

The next four lines represent interface parameters for data transfer from the input device to the proxy device.

Transmission-Mode represents the protocol for data transfer, and FTP is used. Transmission-Trigger describes whether the device that takes the initiative in data transfer is the transmission source or reception destination of transfer and represents the control direction of data transfer. In this example, the transmitting side, i.e., the input device actively activates data transfer and transfers data to the proxy device, and the proxy device passively receives the data. Resolution represents the data resolution for transfer, which is 1,200 dpi in this example. Data-Format represents the data format for transfer, which is JPEG in this example.

Output-Device is the value of Device-id defined by the device profile of the output device included in the path. Output-Address is the network address of the output device.

The next four lines represent interface parameters for data transfer from the proxy device to the output device.

Transmission-Mode represents the protocol for data transfer, and FTP is used. Transmission-Trigger describes whether the device that takes the initiative in data transfer is the transmission source or reception destination of transfer and represents the control direction of data transfer. In this example, the receiving side, i.e., the output device actively activates data transfer and acquires data from the proxy device, and the proxy device passively transfers the requested data. Resolution represents the data resolution for transfer, which is 600 dpi in this example. Data-Format represents the data format for transfer, which is LIPS IV in this example.

Hence, in data transfer using this transfer path profile, the proxy device of this example performs resolution conversion to receive data at 1,200 dpi and transmit it at 600 dpi and data format conversion to receive data in JPEG and transmit it in LIPS IV.

<Virtual Copying Machine Using Combination of Active Devices>

Figure 24:
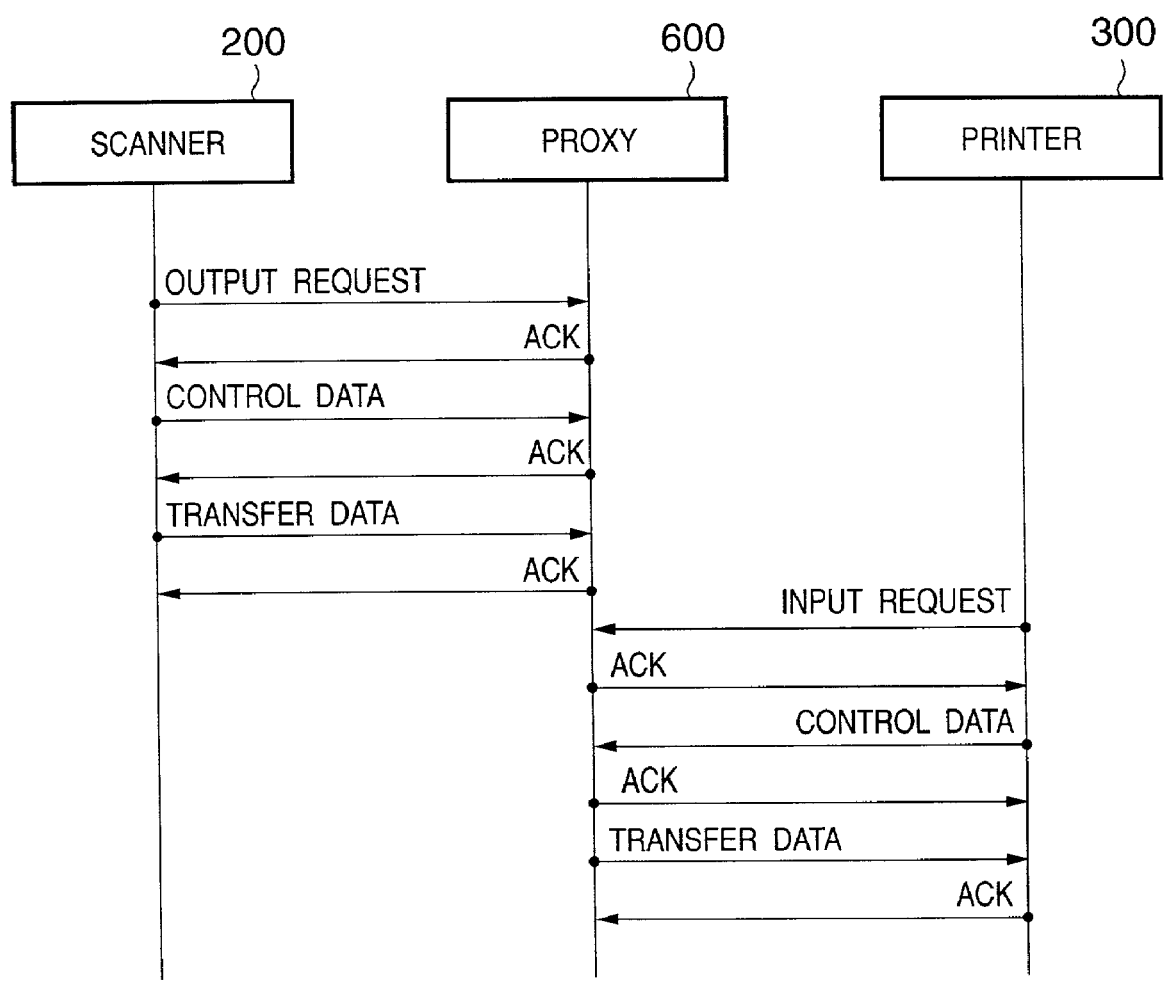
FIG. 24 is a view showing communication between the active input device and the active output device through a proxy device in the second embodiment.

FIG. 24 is a view showing the intercommunication procedure between devices when a remote copy function is implemented by transferring data from the input device to the output device through the proxy device in accordance with the virtual input/output device information of this embodiment.

When the virtual input/output device activated by user operation on the operation panel of the scanner 200 implements a remote copy function constituted by the transfer path from the scanner 200 to the printer 300 through a proxy device 600, the scanner outputs a connection request containing virtual input/output device information to the proxy device (output request).

When the output request is received, the scanner transmits control parameters and sync signal for transfer to the proxy device (control data). Negotiation for the interface condition for transfer can be done at this time. However, without any negotiation, the proxy device can acquire parameters for transfer by searching for the transfer path information shown in FIG. 23 on the basis of the virtual input/output device information designated to the proxy device by the scanner in sending the output request.

When the control data are received, the scanner transmits original image data read by the scanner engine to the proxy device (transfer data).

When the user operates the operation panel of the printer 300 to request the original image read by the scanner 200, the printer outputs a connection request containing the virtual input/output device information to the proxy device (input request).

When the input request is received, the printer transmits control parameters and sync signal for transfer to the proxy device (control data). Negotiation for the interface condition for transfer can be done at this time. However, without any negotiation, the proxy device can acquire parameters for transfer by searching for the transfer path information based on the virtual input/output device information designated to the proxy device by the printer in sending the input request.

When the control data are received, the proxy device transmits the data received from the scanner to the printer (transfer data).

When the transfer data is received by the printer, logic copy operation by the multiple function device using the combination of devices distributed to the network is ended.

<Operation of Scanner in Virtual Copying Machine Using Combination of Active Devices>

Figure 25:
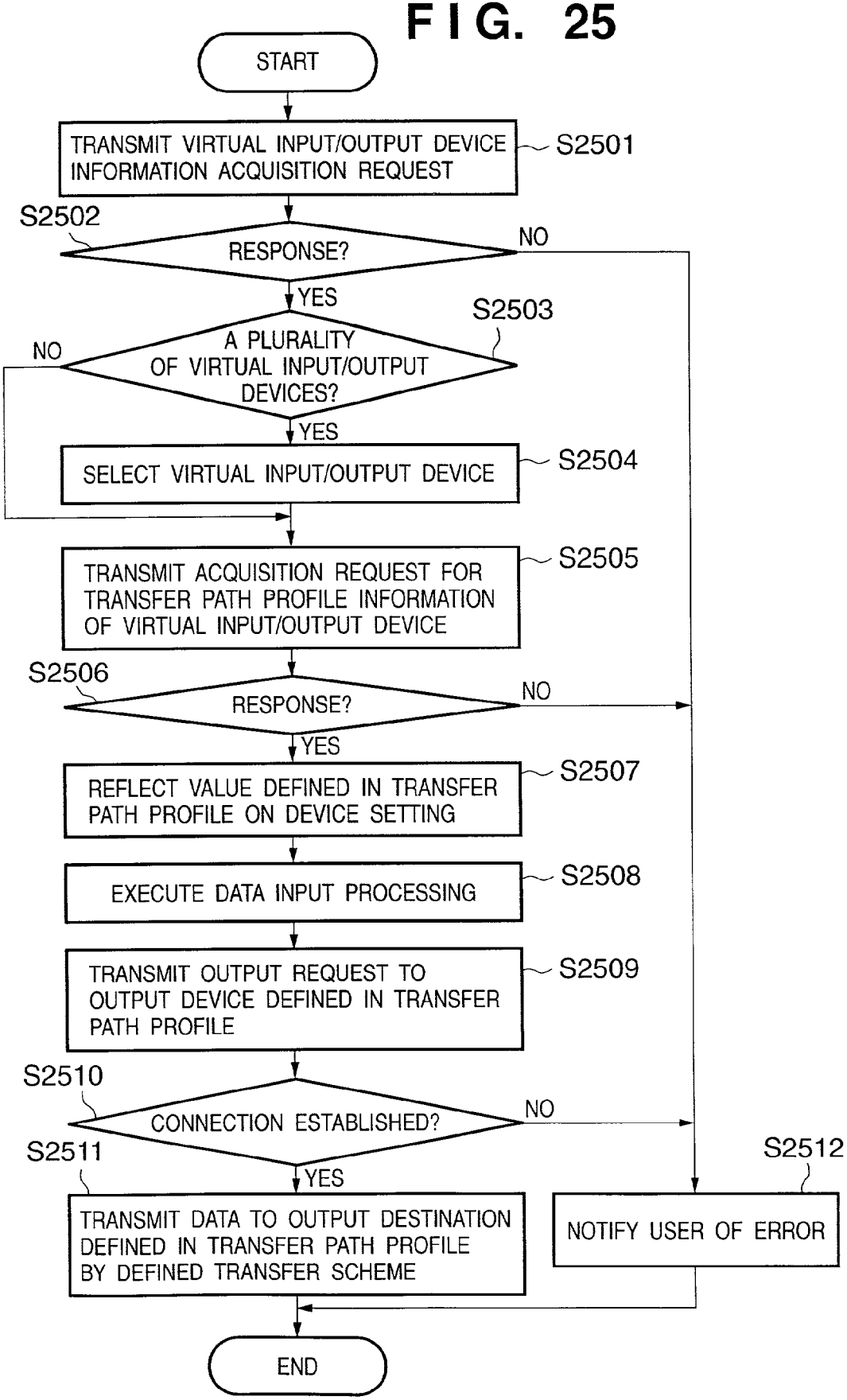
FIG. 25 is a flow chart showing the flow of processing of causing the active input device to transmit data to the output destination in the second embodiment.

FIG. 25 is a flow chart showing processing of causing the scanner of this embodiment to transmit output data to the output destination, i.e., the output device or proxy device in accordance with the virtual input/output device information. S2501 to S2512 represent steps. The control procedure is stored in a ROM 203 of the scanner 200.

When the user presses the right key of a cursor panel 1602 on an operation panel 207 of the scanner 200, a virtual input/output device information acquisition request is transmitted to a server 500 in step S2501 to search for virtual input/output device information in which the input device is defined as the input device of the transfer path profile.

In step S2502, a response is waited for a predetermined period. Upon detecting a response, it is determined in step S2503 whether there are a plurality of pieces of virtual input/output device information that are respondent. If YES in step S2503, the pieces of virtual input/output device information are displayed on a liquid crystal panel 1601 of the operation panel to make the user select an arbitrary virtual input/output device in step S2504.

In step S2505, an instruction is transmitted to acquire transfer path profile information related to the selected virtual input/output device, e.g., pieces of information corresponding to the attributes shown in FIG. 23.

In step S2506, a response is waited for a predetermined period. Upon detecting a response, a connection request containing the virtual input/output device information is sent to the output destination, i.e., the output device or proxy device defined by the transfer path profile in step S2507.

It is determined in step S2508 whether connection to the output destination, i.e., the output device or proxy device is established. If YES in step S2508, the value defined in the transfer path profile is reflected on setting of the input device in step S2509, and data input processing is executed in step S2510.

In step S2511, the input data is transferred to one of the output devices or proxy devices defined in the transfer path profile in accordance with the transfer scheme defined in the transfer path profile.

If NO in step S2502, S2506, or S2510, the user is notified of the error in step S2512, and the processing is ended.

<Operation of Proxy Device in Virtual Copying Machine Using Combination of Active Devices>

Figure 26:
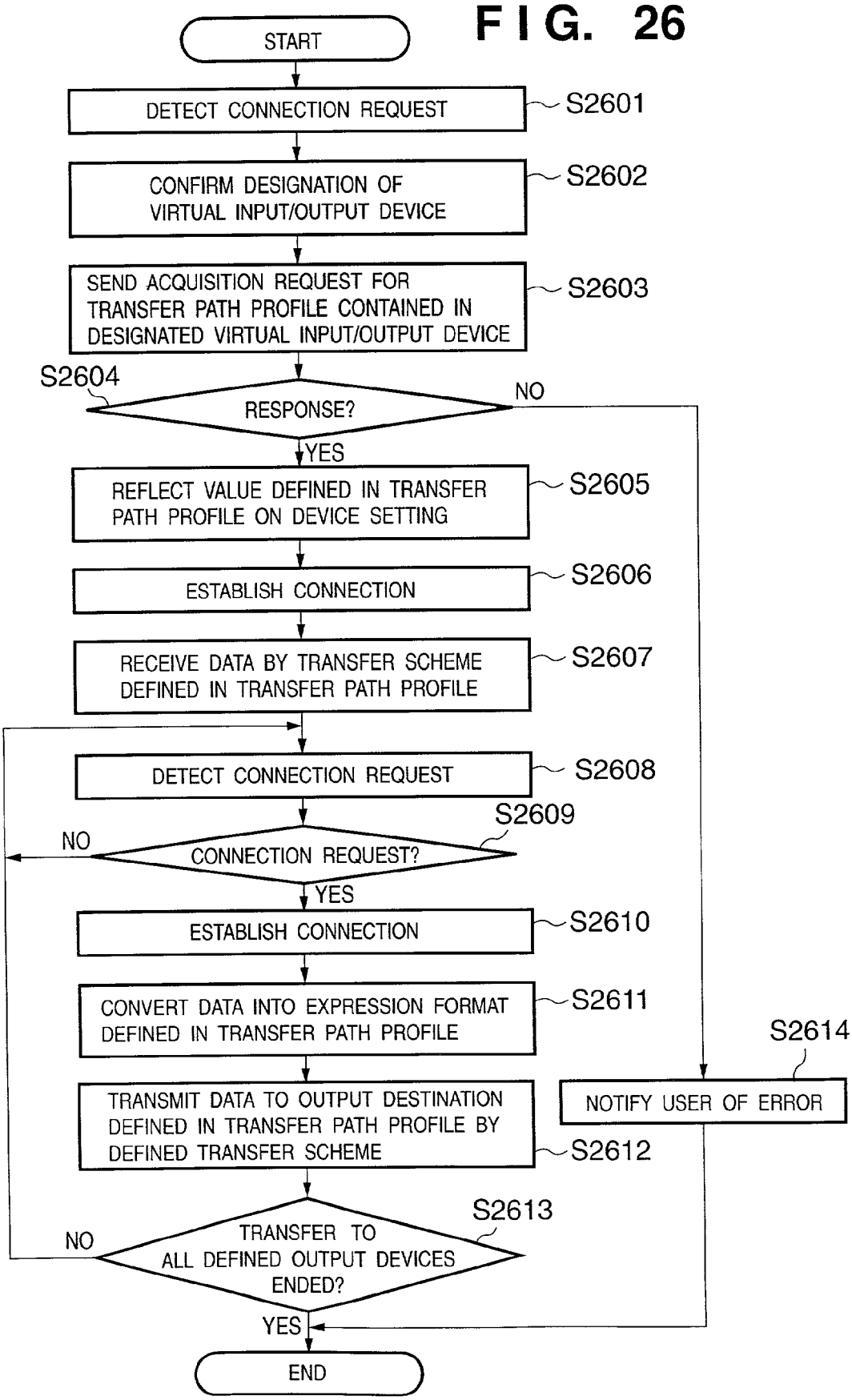
FIG. 26 is a flow chart showing relay processing by the proxy device for connecting active devices in the second embodiment.

FIG. 26 is a flow chart showing processing of causing the proxy device to transfer data received from the input device as an input source to the output device in accordance with the virtual input/output device information. S2601 to S2614 represent steps. The control procedure is stored in a ROM 603 of the proxy device 600.

In step S2601, the processing waits until a connection request is sent from the scanner 200 or the like to the proxy device as an output destination.

When the connection request is received, virtual input/output device information contained in the connection request is confirmed in step S2602. In step S2603, a transfer path information (FIG. 23) acquisition request is transmitted to the server 500 to search for transfer path information corresponding to the virtual input/output device information contained in the connection request.

In step S2604, a response is waited for a predetermined period. Upon detecting a response, setting for data reception is done in step S2605 to receive data in accordance with the transfer parameters (i.e., the resolution, data format, and the like) from the input device to the proxy device, which are described in the transfer path information. In step S2606, connection to the input device as a connection source is established. In step S2607, transfer data from the input device is received in accordance with the transfer parameters described in the transfer path information, and stored in a storage device 605.

In step S2608, the processing waits until a connection request is sent from the printer 300 or the like to the proxy device as an input source.

It is determined in step S2609 on the basis of the virtual input/output device information contained in the connection request whether the connection request is sent from the output device to constitute the virtual input/output device which is currently being executed. If NO in step S2609, the connection request is neglected, and the processing waits again in step S2608. If YES in step S2609, the processing is continued.

In step S2610, connection to the output device as a connection source is established. Transfer data is converted in accordance with the transfer parameters such as the resolution and format for data transfer to the output device defined in the transfer path profile in step S2611. In step S2612, the transfer data is transmitted to one of the output devices or proxy devices defined in the transfer path profile in accordance with the transfer scheme defined in the transfer path profile.

It is confirmed in step S2613 whether data transfer processing to all output destinations defined in the transfer path profile is ended. If NO in step S2613, the flow returns to step S2608 to repeat the data transfer processing until the processing for all output destinations is ended, and the processing is ended.

If NO in step S2604, the user is notified of the error in step S2614, and the processing is ended.

<Operation of Printer in Virtual Copying Machine Using Combination of Active Devices>

Figure 27:
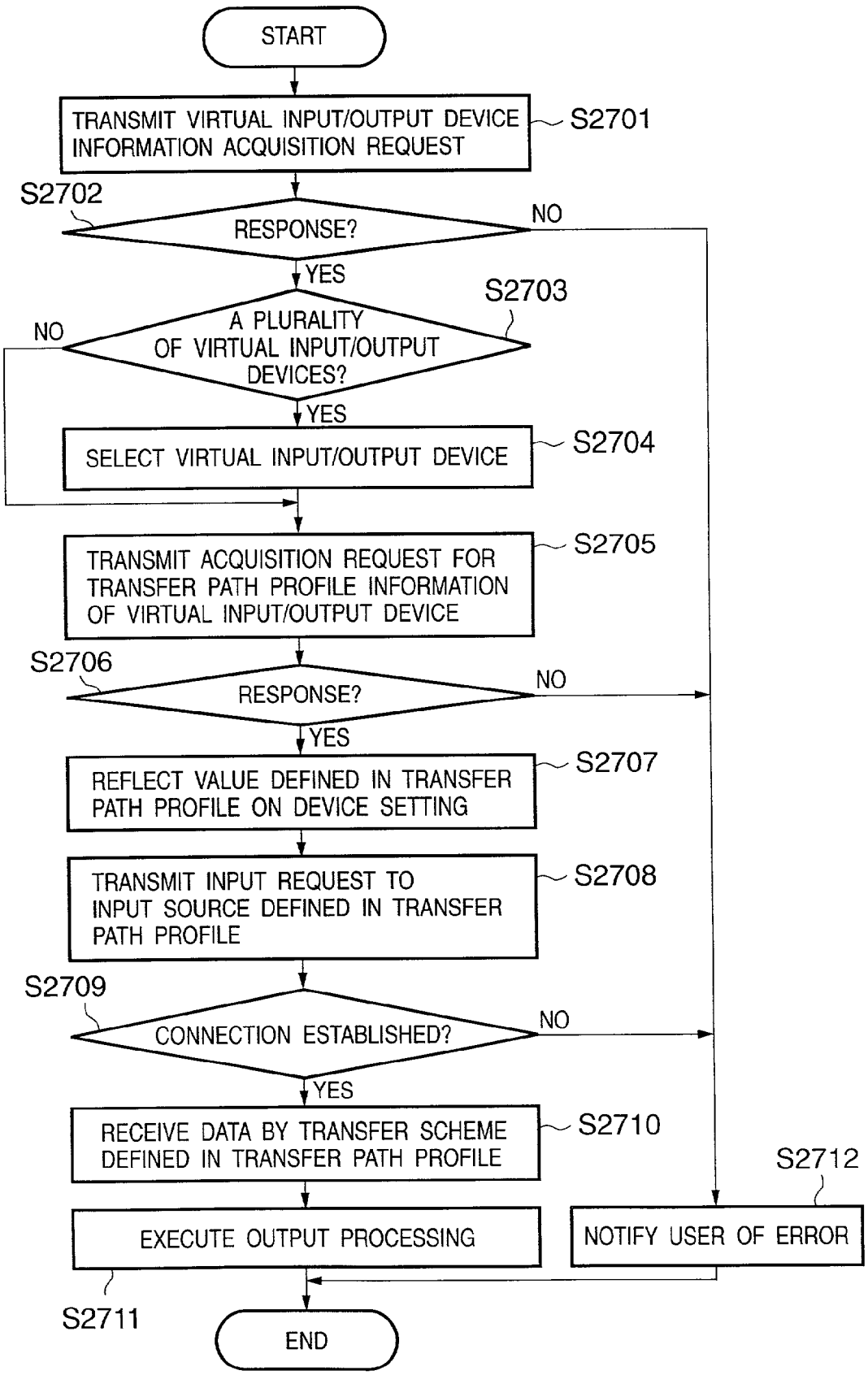
FIG. 27 is a flow chart showing the flow of processing of causing the active output device to receive data from the input source.

FIG. 27 is a flow chart showing the flow of processing of causing the active output device of this embodiment to receive data from the input source. S2701 to S2712 represent steps. The control procedure is stored in a ROM 303 of the printer 300.

When the user presses the right key of the cursor panel 1602 on an operation panel 307 of the printer 300, a virtual input/output device information acquisition request is transmitted to the server 500 in step S2701 to search for virtual input/output device information in which the printer is defined as the output device of the transfer path profile.

In step S2702, a response is waited for a predetermined period. Upon detecting a response, it is determined in step S2703 whether there are a plurality of pieces of responded virtual input/output device information. If YES in step S2703, the pieces of virtual input/output device information are displayed on the liquid crystal panel 1601 of the operation panel to make the user select an arbitrary virtual input/output device in step S2704.

In step S2705, an instruction is transmitted to acquire transfer path profile information related to the selected virtual input/output device, e.g., pieces of information corresponding to the attributes shown in FIG. 23.

In step S2706, a response is waited for a predetermined period. Upon detecting a response, setting for data reception is done in step S2707 to receive data in accordance with transfer parameters (i.e., the resolution, data format, and the like) from the proxy device to the printer, which are described in the transfer path information. In step S2708, a connection request containing the virtual input/output information is output to the input source as the input device or proxy device defined by the transfer path profile.

It is determined in step S2709 whether connection to the input source is established. If YES in step S2709, transfer data from the proxy device is received in accordance with the transfer parameters described in the transfer path information and in step S2710.

In step S2711, the received data is printed by the printer engine. When the data is completely printed, the processing is ended.

If NO in step S2702, S2706, or S2709, the user is notified of the error in step S2712, and the processing is ended.

In this embodiment, the input device, output device, and proxy device form independent network nodes. However, some of the functions of the devices may be arranged in one network node, i.e., device. In this case, the function of executing transfer to an output device together with data format matching for another input device may be provided in an input device or output device. The server computer may have the function of the proxy device.

In this embodiment, the server 500 stores the device profile, transfer path profile, user profile, and virtual input/output device definition information. When the server 500 is not present, the input or output device that receives a device profile acquisition request may directly notify the request source of the current configuration information by itself. The transfer path profile and virtual input/output device definition may also be stored in the recording device of the host computer, which has generated these pieces of information, and transmitted to the input or output device in accordance with a request from the input or output device. Alternatively, after the transfer path profile and virtual input/output device definition are generated, they may be transmitted to the input and output devices as an input source and output destination and stored in the storage devices of the input and output devices such that the information can be acquired from these devices.

In this embodiment, the device profile, transfer path profile, user profile, and virtual input/output device definition information are generated by the host computer. However, the profiles may be generated by the server, input device, output device, or proxy device.

In this embodiment, the device profile, transfer path profile, user profile, and virtual input/output device definition information are generated and stored in the server in advance. However, the profiles may be dynamically generated in real time when virtual input and output devices are selected in the devices.

As described above, according to the second embodiment, in addition to the effects of the first embodiment, the user performs operation on a device such as a push scanner or pull printer and thus combines new active input and output devices connected to another device, thereby using the devices as components of a virtual logic input/output device.

<Effects of First and Second Embodiments>

As described above in detail, according to the first and second embodiments, in a distributed system in which when the proxy device relays data transfer, the master-slave relationship of data transfer control is adjusted to combine input and output devices distributed to the network in accordance with a transfer path profile, thereby implementing a composite function, input and output devices whose assumed data transfer control directions do not match can be combined to define a transfer path profile having a more flexible combination, and a larger number of virtual input/output devices can be easily formed from the input and output devices connected to the network.

[Third Embodiment]

The third embodiment of the present invention will be described below in detail with reference to the accompanying drawings. The network configuration and the arrangement of each device in the network are the same as in FIGS. 1 to 6 of the first embodiment, and a detailed description thereof will be omitted. In this embodiment, however, unlike the virtual input/output device of the first or second embodiment in which active input and output devices or passive input and output devices are combined, input and output devices one of which is an active device and the other is a passive device are combined. Hence, the device profiles of the combined devices are different from the first and second embodiments.

A device profile which describes the device attribute of each device and processing of causing each device to announce through the network in this embodiment will be described.

<Device Profile>

FIG. 21 is a view showing device profile information according to the third embodiment, which describes the device information of an active image scanner.

Device-Type represents the type of device, i.e., whether the device is an input device or output device, or a proxy device (filter) for performing transfer. The device type is described in more detail after a slash (/). In this example, "input-device/scanner" describes that the device is an input device and, more specifically, an image scanner.

Device-Id represents the identifier (scan 5) of the device.

Device-Address represents the network address of the device. In this case, IP address "172.16.10.2" is described assuming the TCP/IP network.

Transmission-Mode represents the supported transfer protocol and control direction. "FTP/Passive" described here means that the device having this device profile supports data transfer by FTP as a well-known file transfer protocol, and this device has the initiative in data transfer control. More specifically, the scanner of this example reads an original image using user operation on the operation panel of the scanner device as a trigger and transfers the read image data to another device as an output destination in accordance with a request issued from the scanner device. An input device that starts such active data transfer will be called an active input device.

Resolution represents the data processing resolution. In this example, it is described that an original image can be read as image data having a resolution of 1,200 dpi (dot per inch).

Data-Format represents the supported data format. In this example, JPEG, JIF, and LIPS IV are supported.

FIG. 8 is a view showing another device profile information according to the third embodiment, which describes the device information of a passive printer.

Device-Type represents the type of device, i.e., whether the device is an input device or output device, or a proxy device (filter) for performing transfer. The device type is described in more detail after a slash (/). In this example, "output-device/printer" describes that the device is an output device and, more specifically, a printer.

Device-Id represents the identifier (lp5-1) of the device.

Device-Address represents the network address of the device. In this case, IP address "172.16.10.5" is described assuming the TCP/IP network.

Transmission-Mode represents the supported transfer protocol and control direction. "LPD/Passive, FTP/Passive" described here defines that the device having this device profile supports data transfer by the protocols FTP and LPD (LPS), and this device is passively controlled by a remote device in data transfer. More specifically, the printer of this example receives print data to be printed in accordance with a request issued from the data transmission source. An output device that passively waits for the start of data transfer will be called a passive output device.

Resolution represents the data processing resolution. In this example, it is described that input image data having a resolution of 600 dpi (dot per inch) can be received and printed.

Data-Format represents a supported data format. In this example, LIPS IV is supported.

FIG. 9 is a view showing still another device profile information according to the first embodiment, which describes the device information of a proxy device having an interface conversion function.

Device-Type represents the type of device, i.e., whether the device is an input device or output device, or a proxy device (filter) for performing transfer. The device type is described in more detail after a slash (/). In this example, "filter-device/conv" describes that the device is a proxy device and, more specifically, a filter device having an interface conversion function.

Device-Id represents the identifier (proxy0) of the device.

Device-Address represents the network address of the device. In this case, IP address "172.16.10.10" is described assuming the TCP/IP network.

The proxy device of filter-device/conv type has descriptions of reception and transmission interface conditions supported by the device.

Receive-Transmission-Mode represents the transfer protocol and control direction supported in the reception mode. "FTP/Passive, Active" described here means that the device having this device profile supports data reception by FTP as a well-known file transfer protocol, and either this device or a transmission source device can take the initiative in controlling data reception from the transmission source device.

Send-Transmission-Mode represents the transfer protocol and control direction supported in the transmission mode. "FTP/Passive, Active" described here means that the device having this device profile supports data transmission by FTP as a well-known file transfer protocol, and either this device or a transmission destination device can take the initiative in controlling data transfer.

Receive-Resolution represents the reception data resolution and that image data having a resolution of 1,200 dpi, 600 dpi, 400 dpi, or 300 dpi can be received and processed. Send-Resolution represents the transmission data resolution and that the device is capable of transmitting data while converting the resolution to 1,200 dpi, 600 dpi, 400 dpi, 300 dpi, or 100 dpi.

Receive-Data-Format represents the data format supported in the reception mode. In this example, JPEG is supported. Send-Data-Format represents the data format supported in the transmission mode. In this example, the device is capable of transmitting data while converting the data format to JPEG, GIF, or LIPS IV.

Processing in the input device, output device, or proxy device of this embodiment when the device information is to be announced to the network upon powering on the device or changing setting on the operation panel or the like is the same as that shown in the flow chart of FIG. 10 of the first embodiment. FIG. 10 has already been described, and a detailed description thereof will be omitted here.

Processing which is executed by a CPU 401 of a host computer 400 to determine the transfer scheme between the input and output devices in accordance with the device information of each of the input and output devices of the present invention and generate a virtual input/output device is the same as that shown in the flow charts of FIGS. 11 and 12 of the first embodiment, and a detailed description thereof will be omitted here. A GUI used to select an output device to be used when a plurality of output devices are present is also the same as that shown in FIG. 13 of the first embodiment.

However, although the procedure of forming a virtual input/output device is the same as in the first embodiment, the arrangement of the formed virtual input/output device and a control method for the virtual input/output device are different from the first embodiment because the profiles of the input and output devices are different from the first embodiment, i.e., the input device is an active scanner, the output device is a passive printer.

In this embodiment, a transfer path profile as shown in FIG. 28 is generated in step S1111 of FIG. 11. When a proxy device for matching the interfaces is inserted to connect the selected input and output devices, a transfer path profile including the proxy device is generated.

The generated transfer path profile shown in FIG. 28 and preference unique to the user are combined into virtual input/output device information for defining a logic input/output device, transmitted, and stored in a recording device 511 of a server computer 500 as an area that can be referred to by the input or output device. The stored device profile of the virtual input/output device is the same as that shown in FIG. 15 of the first embodiment. The identifier of the transfer profile is #234 and the same as in the first embodiment. However, the transfer profile of the third embodiment has contents shown in FIG. 28 while the transfer profile of the first embodiment has contents shown in FIG. 14.

FIG. 28 shows a transfer path profile according to this embodiment. Note that in the transfer path profile of this example, the description order of lines is meaningful.

Path-Set attribute describes a path for connecting devices by a set of device IDs and also describes a plurality of paths as a list.

Input-Device is the value of Device-id defined by the device profile of the input device included in the path. Input-Address is the network address of the input device.

Filter-Device is the value of Device-id defined by the device profile of the proxy device included in the path. Filter-Address is the network address of the proxy device.

The next four lines represent interface parameters for data transfer from the input device to the proxy device.

Transmission-Mode represents the protocol for data transfer, and FTP is used. Transmission-Trigger describes whether the device that takes the initiative in data transfer is the transmission source or reception destination of transfer and represents the control direction of data transfer. In this example, the transmitting side, i.e., the scanner (input device) actively transmits data, and the proxy device passively receives the transferred data. Resolution represents the data resolution for transfer, which is 1,200 dpi in this example. Data-Format represents the data format for transfer, which is JPEG in this example.

Output-Device is the value of Device-id defined by the device profile of the output device included in the path. Output-Address is the network address of the output device.

The next four lines represent interface parameters for data transfer from the proxy device to the output device.

Transmission-Mode represents the protocol for data transfer, and LPD is used. Transmission-Trigger describes whether the device that takes the initiative in data transfer is the transmission source or reception destination of transfer and represents the control direction of data transfer. In this example, the transmitting side, i.e., the proxy device actively transmits data, and the printer (output device) passively receives the transferred data. Resolution represents the data resolution for transfer, which is 600 dpi in this example. Data-Format represents the data format for transfer, which is LIPS IV in this example.

Hence, in data transfer using this transfer path profile, the proxy device of this example performs protocol conversion to receive data by FTP and transmits it by LPD, resolution conversion to receive data at 1,200 dpi and transmit it at 600 dpi, and data format conversion to receive data in JPEG and transmit it in LIPS IV.

In copying an original, the user in front of a network scanner 200 sets the original and operates an operation panel 207 of the scanner to activate a logic virtual input/output device distributed to the network. The operation panel 207 of the network scanner 200 has the same outer appearance shown in FIG. 16A and the same arrangement as the operation panel of the proxy device 600 of the first embodiment.

<Data Transfer Sequence in Virtual Copying Machine>

Figure 29:
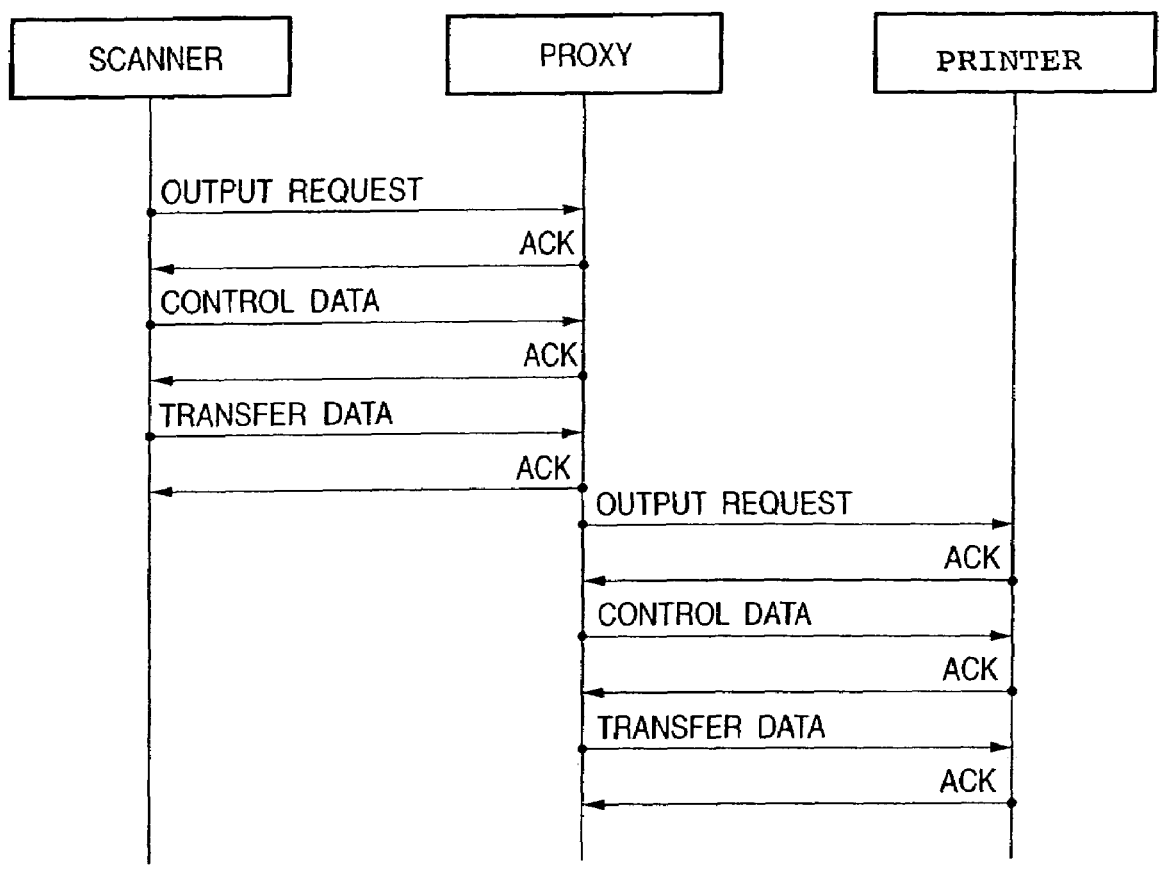
FIG. 29 is a view showing communication between an active input device and a passive output device through a proxy device in the third embodiment.

FIG. 29 is a view showing the intercommunication procedure between devices when a remote copy function is implemented by transferring data from the input device to the output device through the proxy device in accordance with the virtual input/output device information of this embodiment, i.e., a table having the format shown in FIG. 15, in which the virtual input/output device name and the transfer path profile are made to correspond.

When the virtual input/output device activated by user operation on the operation panel 207 of the scanner 200 as an active input device implements a remote copy function constituted by the transfer path from the scanner 200 to a printer 300 through a proxy device 600, the scanner outputs a connection request containing virtual input/output device information to the proxy device (output request).

When the output request is received, the scanner transmits control parameters and sync signal for transfer to the proxy device (control data). Negotiation for the interface condition for transfer can be done at this time. However, without any negotiation, the proxy device can acquire parameters for transfer by searching for the transfer path information shown in FIG. 28 on the basis of the virtual input/output device information designated to the proxy device by the scanner in sending the output request.

When the control data are received, the scanner transmits original image data read by the scanner engine to the proxy device (transfer data).

The proxy device receives the transfer data from the scanner and then outputs a connection request containing the virtual input/output device information to the printer (output request).

When the output request is received, the proxy device transmits control parameters and sync signal for transfer to the printer (control data). Negotiation for the interface condition for transfer can be done at this time. However, without any negotiation, the printer can acquire parameters for transfer by searching for the transfer path information based on the virtual input/output device information designated to the printer by the proxy device in sending the output request.

When the control data are received, the proxy device transmits the data received from the scanner to the printer (transfer data). At this time, the proxy device converts the received transfer data into an interface condition under which the printer can receive the data, as described in the transfer path information shown in FIG. 28.

When the transfer data is received by the printer, logic copy operation distributed to the network is ended.

<Operation of Scanner in Virtual Copying Machine>

Figure 30:
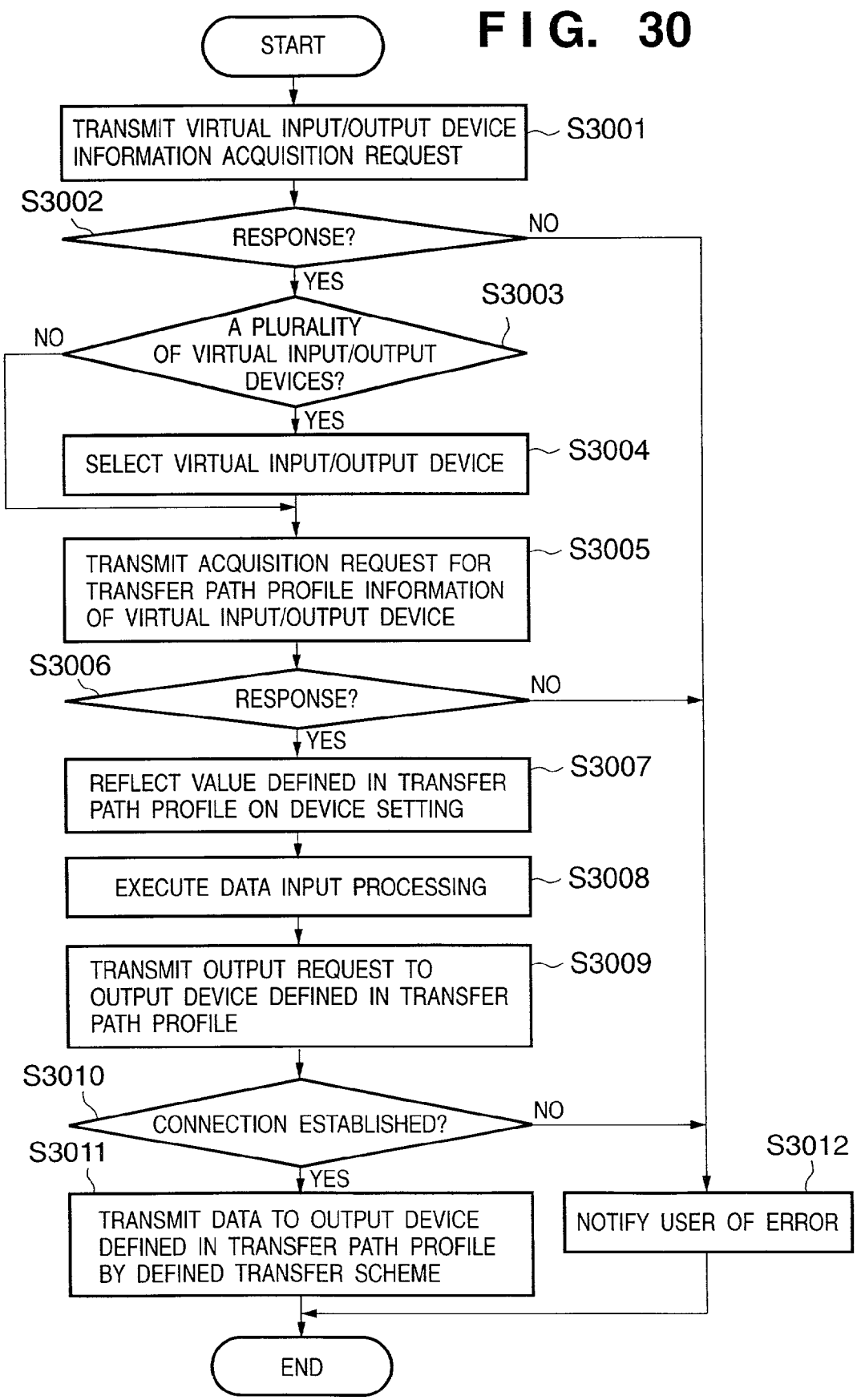
FIG. 30 is a flow chart showing the flow of processing of causing the active input device to transmit data to the output destination in the third embodiment.

FIG. 30 is a flow chart showing processing of causing the scanner of this embodiment to transmit output data to the output destination, i.e., the output device or proxy device in accordance with the logic input/output device information. S3001 to S3012 represent steps. The control procedure is stored in a ROM 203 of the scanner 200.

When the user presses the right key of a cursor panel 1602 on the operation panel 207 of the scanner 200, a virtual input/output device information acquisition request is transmitted to the server 500 in step S3001 to search for virtual input/output device information in which the input device is defined as the input device of the transfer path profile.

In step S3002, a response is waited for a predetermined period. Upon detecting a response, it is determined in step S3003 whether there are a plurality of pieces of virtual input/output device information that are respondent. If YES in step S3003, the pieces of virtual input/output device information are displayed on a liquid crystal panel 1601 of the operation panel to make the user select an arbitrary virtual input/output device in step S3004.

In step S3005, an instruction is transmitted to acquire transfer path profile information related to the selected virtual input/output device, e.g., pieces of information corresponding to the attributes shown in FIG. 28.

In step S3006, a response is waited for a predetermined period. Upon detecting a response, a connection request containing the virtual input/output device information is sent to the output device, i.e., the output device or proxy device defined by the transfer path profile in step S3007.

It is determined in step S3008 whether connection to the output destination, i.e., the output device or proxy device is established. If YES in step S3008, the value defined in the transfer path profile is reflected on setting of the input device in step S3009, and data input processing is executed in step S3010.

In step S3011, the input data is transferred to one of the output devices or proxy devices defined in the transfer path profile in accordance with the transfer scheme defined in the transfer path profile.

If NO in step S3002, S3006, or S3010, the user is notified of the error in step S3012, and the processing is ended.

<Operation of Proxy Device in Virtual Copying Machine>

Figure 31:
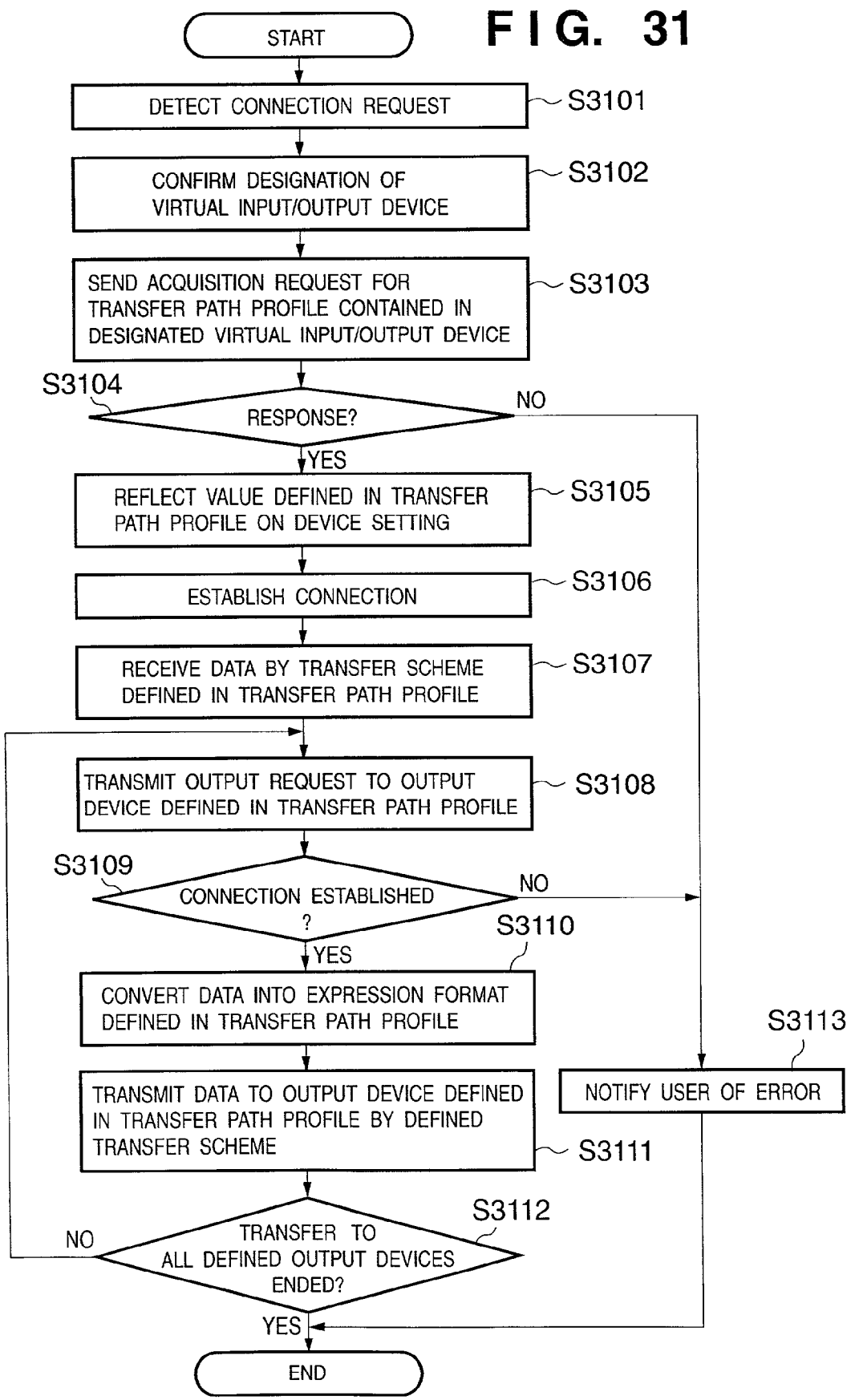
FIG. 31 is a flow chart showing relay processing by the proxy device.

FIG. 31 is a flow chart showing processing of causing the proxy device to transfer data received from the input device as an input source to the output device in accordance with the logic input/output device information. S3101 to S3113 represent steps. The control procedure is stored in a ROM 603 of the proxy device 600.

In step S3101, the processing waits until a connection request is sent from the scanner 200 or the like to the proxy device as an output destination.

When the connection request is received, a transfer path information (FIG. 28) acquisition request is transmitted to the server 500 to search for transfer path information corresponding to the virtual input/output device information contained in the connection request in step S3103.

In step S3104, a response is waited for a predetermined period. Upon detecting a response, setting for data reception is done in step S3105 to receive data in accordance with the transfer parameters (i.e., the resolution, data format, and the like) from the input device to the proxy device, which are described in the transfer path information. In step S3106, connection to the input device as a connection source is established. In step S3107, transfer data from the input device is received in accordance with the transfer parameters described in the transfer path information, and stored in a storage device 605.

In step S3108, a connection request is sent to the output destination as the output device defined by the transfer path profile.

It is determined in step S3109 whether connection to the output destination is established. If YES in step S3109, transfer data is converted in accordance with the transfer parameters such as the resolution and format for data transfer to the output device defined in the transfer path profile in step S3110. In step S3111, the input data is transmitted to one of the output devices or proxy devices defined in the transfer path profile in accordance with the transfer scheme defined in the transfer path profile.

It is confirmed in step S3112 whether data transfer processing to all output destinations defined in the transfer path profile is ended. If NO in step S3112, the flow returns to step S3108 to repeat the data transfer processing until the processing for all output destinations is ended, and the processing is ended.

If NO in step S3104 or S3109, the user is notified of the error in step S3113, and the processing is ended.

In this example, received data is temporarily stored, and then, the data is converted and transmitted. Instead, the received data may be converted in real time at the time of reception. Alternatively, transmission data may be converted in real time at the time of transmission. In these cases, depending on the contents of conversion processing, the received data may be converted in real time and transferred to the transmission destination without temporarily storing the received data in the storage device 605.

The procedure shown in FIG. 29 is implemented by the above operation procedures of the scanner and proxy device. The operation procedure of the printer (output device) is the same as in FIG. 20 of the first embodiment. When a connection request is detected, connection to the scanner is established by referring to the virtual input/output device information, and data is received by the transfer scheme defined in the transfer path profile and printed.

As described above, according to this embodiment, the proxy device converts data in relaying data transfer. Hence, in a distributed system which implements a composite function such as remote copy by combining devices such as a scanner and printer distributed to the network in accordance with a transfer path profile, input and output devices can be combined even when the processible type and format of transfer data are different between the input-side device and the output-side device, so the flexibility in combination improves.

According to this embodiment, to detect a set of combinable devices, the proxy device is inserted, and not only the input and output devices but also the proxy device announces its device configuration information to the network as a device profile. Since the system almost automatically searches for a transfer path and forms a transfer path profile on the basis of the device profiles, possible combinations transparent to the user are dynamically formed. Hence, the user can use a distributed system formed from a number of combinations without any cumbersome operation.

According to this embodiment, since the proxy device can be entrusted with the data conversion function, the input and output devices need not to be compatible to many kinds of transfer data formats and resolutions. For this reason, the input and output devices can be simplified, and accordingly, the devices can be implemented at lower cost. For the entire system, identical data conversion mechanisms need not be prepared, and the system cost can be reduced.

According to this embodiment, only the proxy device need to concentratedly have various data conversion mechanisms. Since only the proxy device need be updated to cope with a new conversion method, the system extendability improves, and the system management becomes easy.

[Fourth Embodiment]

The fourth embodiment of the present invention will be described below. The same reference numerals as in the first to third embodiments denote the same components in the fourth embodiment, and a detailed description thereof will be omitted. In this embodiment, a virtual copying machine which combines a passive scanner having the device profile shown in FIG. 7 of the first embodiment and an active printer having the device profile shown in FIG. 22 of the second embodiment will be described.

FIG. 32 shows a transfer path profile according to this embodiment. Note that in the transfer path profile of this example, the description order of lines is meaningful.

Path-Set attribute describes a path for connecting devices by a set of device IDs and also describes a plurality of paths as a list.

Input-Device is the value of Device-id defined by the device profile of the input device included in the path. Input-Address is the network address of the input device.

Filter-Device is the value of Device-id defined by the device profile of the proxy device included in the path. Filter-Address is the network address of the proxy device.

The next four lines represent interface parameters for data transfer from the input device to the proxy device.

Transmission-Mode represents the protocol for data transfer, and FTP is used. Transmission-Trigger describes whether the device that takes the initiative in data transfer is the transmission source or reception destination of transfer and represents the control direction of data transfer. In this example, the receiving side, i.e., the proxy device actively activates data transfer and acquires data from the input device, and the input device passively transfers the requested data.

Resolution represents the data resolution for transfer, which is 1,200 dpi in this example. Data-Format represents the data format for transfer, which is JPEG in this example.

Output-Device is the value of Device-id defined by the device profile of the output device included in the path. Output-Address is the network address of the output device.

The next four lines represent interface parameters for data transfer from the proxy device to the output device.

Transmission-Mode represents the protocol for data transfer, and FTP is used. Transmission-Trigger describes whether the device that takes the initiative in data transfer is the transmission source or reception destination of transfer and represents the control direction of data transfer. In this example, the receiving side, i.e., the output device actively activates data transfer and acquires data from the proxy device, and the proxy device passively transfers the requested data. Resolution represents the data resolution for transfer, which is 600 dpi in this example. Data-Format represents the data format for transfer, which is LIPS IV in this example.

Hence, in data transfer using this transfer path profile, the proxy device of this example performs resolution conversion to receive data at 1,200 dpi and transmit it at 600 dpi and data format conversion to receive data in JPEG and transmit it in LIPS IV.

Figure 33:
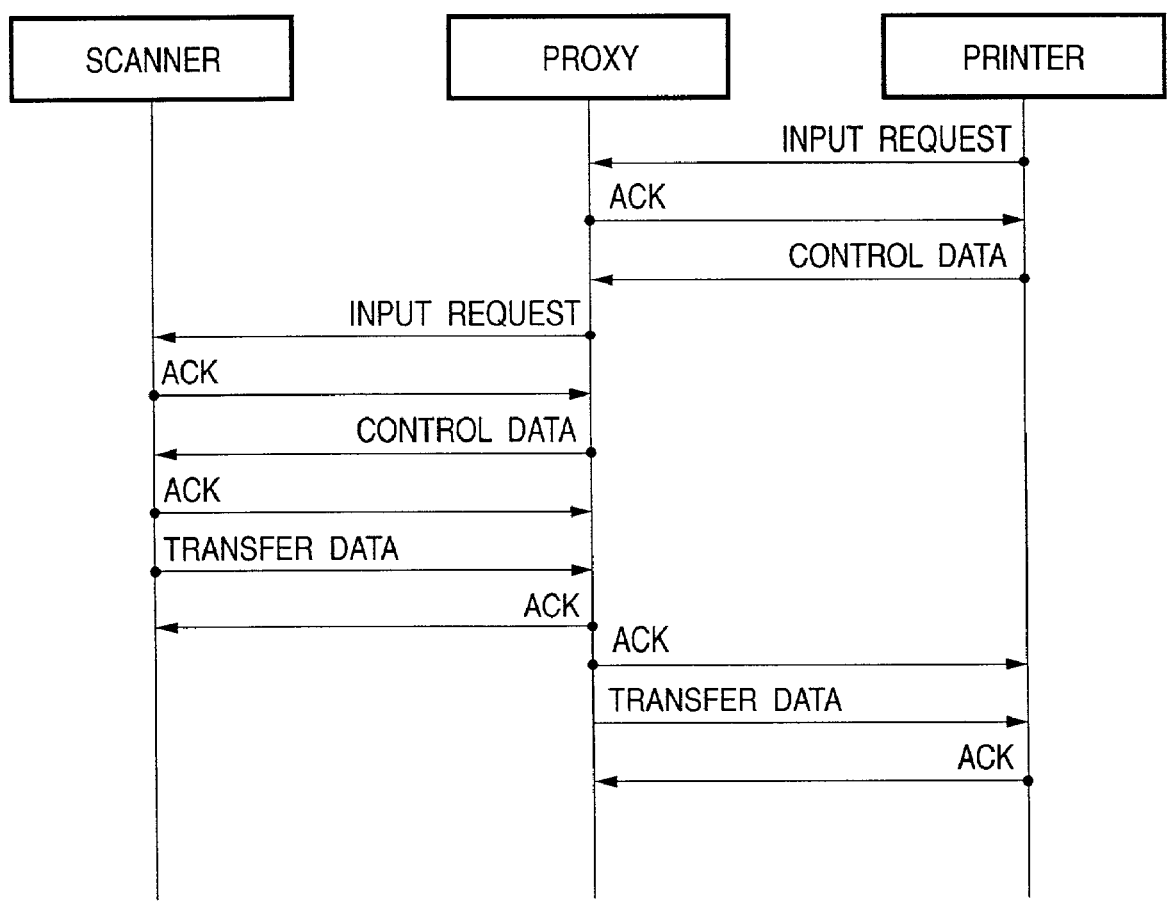
FIG. 33 is a view showing communication between the passive input device and the active output device through a proxy device in the fourth embodiment.

FIG. 33 is a view showing the intercommunication procedure between devices when a remote copy function is implemented by transferring data from the input device to the output device through the proxy device in accordance with the virtual input/output device information of this embodiment, i.e., a table having the format shown in FIG. 15, in which the virtual input/output device name and the transfer path profile are made to correspond.

The same user interface as that shown in FIG. 16A is provided to an operation panel 307 of a printer 300 as an active output device. When the user presses the right key of a cursor panel 1602 on the operation panel, a virtual input/output device information acquisition request is transmitted to a server 500 to search for virtual input/output device information in which the printer is defined as the output device of the transfer path profile.

When the virtual input/output device activated by user operation on the operation panel 307 implements a remote copy function constituted by the transfer path shown in FIG. 32 from a passive scanner 200 to the printer 300 through a proxy device 600, the printer outputs an input request containing virtual input/output device information to the proxy device (input request).

When the input request is received, the printer transmits control parameters and sync signal for transfer to the proxy device (control data). Negotiation for the interface condition for transfer can be done at this time. However, without any negotiation, the proxy device can acquire parameters for transfer by searching for the transfer path information shown in FIG. 32 based on the virtual input/output device information designated to the proxy device by the printer in sending the input request.

Next, the proxy device sends an input request containing the virtual input/output device information to the scanner (input request).

When the input request is received, the proxy device transmits control parameters and sync signal for transfer to the scanner (control data). Negotiation for the interface condition for transfer can be done at this time. However, without any negotiation, the scanner can acquire parameters for transfer by searching for the transfer path information on the basis of the virtual input/output device information designated to the scanner by the proxy device in sending the output request.

The scanner receives the control data from the proxy device and transmits original image data read by the scanner engine to the proxy device (transfer data).

The proxy device receives the transfer data from the scanner and also receives the control data from the printer. The proxy device transmits the data received from the scanner to the printer (transfer data). At this time, the proxy device converts the received transfer data into an interface condition under which the printer can receive the data, as described in the transfer path information shown in FIG. 32.

When the transfer data is received by the printer, logic copy operation distributed to the network is ended.

Operations of the scanner, proxy device, and printer which execute the procedure shown in FIG. 32 are the same as those described in the third embodiment.

In this embodiment, the input device, output device, and proxy device form independent network nodes. However, some of the functions of the devices may be arranged in one network node, i.e., device. In this case, the function of executing transfer to an output device together with data format matching for another input device may be provided in an input device or output device. The server computer may have the function of the proxy device.

In this embodiment, the server 500 stores the device profile, transfer path profile, user profile, and virtual input/output device definition information. When the server 500 is not present, the input or output device that receives a device profile acquisition request may directly notify the request source of the current configuration information by itself. The transfer path profile and virtual input/output device definition may also be stored in the recording device of the host computer, which has generated these pieces of information, and transmitted to the input or output device in accordance with a request from the input or output device. Alternatively, after the transfer path profile and virtual input/output device definition are generated, they may be transmitted to the input and output devices as an input source and output destination and stored in the storage devices of the input and output devices such that the information can be acquired from these devices.

In this embodiment, the device profile, transfer path profile, user profile, and virtual input/output device definition information are generated by the host computer. However, the profiles may be generated by the server, input device, output device, or proxy device.

In this embodiment, the device profile, transfer path profile, user profile, and virtual input/output device definition information are generated and stored in the server in advance. However, the profiles may be dynamically generated in real time when virtual input and output devices are selected in the devices.

As described above, according to this embodiment, in addition to the effects of the third embodiment, even in a distributed input/output system activated from an active output device such as a pull printer, the proxy device relays a data request from a downstream device to an upstream device of the data transfer path, and the transfer data is converted when the proxy device relays the transfer data from the upstream to the downstream of the data transfer path whereby input and output devices can be combined even when the processible type and format of transfer data are different between the input-side device and the output-side device, so the flexibility in combination improves.

<Effects of Third and Fourth Embodiments>

As described above in detail, according to the third and fourth embodiments, in a distributed system in which a proxy device converts transfer data in relaying data transfer to combine input and output devices distributed to the network in accordance with a transfer path profile, thereby implementing a composite function, input and output devices whose processible transfer data expression formats are different can be combined to define a transfer path profile having a more flexible combination, and a larger number of virtual input/output devices can be easily formed from the input and output devices connected to the network.

[Fifth Embodiment]

The arrangements of an image scanner as an input device and a laser printer as an output device, to which this embodiment can be suitably applied, and the configuration of a network which connects the devices are the same as in the first embodiment, and a detailed description thereof will be omitted.

FIGS. 34A, 34B, and 34C are views showing device profile information according to the fifth embodiment. FIG. 34A shows the device profile of the scanner, FIG. 34B shows the device profile of the proxy device, and FIG. 34C shows the device profile of the printer.

Referring to FIGS. 34A to 34C, for example, Device-Type represents whether the device is an input device or output device, or a proxy device (filter) for performing transfer. The device type is described in more detail after a slash (/). Especially, the proxy device is specified into a more detailed type to indicate its function as a transfer filter. Referring to FIG. 34B, "tee" of Device-Type represents that the proxy device behaves as a filter for performing 1-input/multiple-output transfer. Device-Id represents the identifier of each device. Device-Address represents the network address of it own. Transmission-Mode represents the supported transfer protocol. Resolution represents the data processing resolution. Media-Size represents the supported paper size. Data-Format represents the supported data format.

The processing procedure of announcing these device profiles to the network upon powering on the input device, output device, or proxy device or changing setting on the operation panel or the like is the same as that shown in the flow chart of FIG. 10 of the first embodiment.

FIG. 35 is a view showing the transfer path profile according to the fifth embodiment.

Input-Device is the value of Device-Id defined by the device profile of the input device. Input-Address is the network address of the input device. Output-Device is the value of Device-Id defined by the device profile of the output device. Output-Address is the network address of the output device. Output-Tray is the discharge destination defined in the device profile of the output device.

According to the transfer path profile of this example, a network scanner 100 selects 172.16.10.10 written in Output-Address as an output device, reads an original at a resolution of 600 dpi written in Resolution, and transmits print data in LIPS IV written in Document-Format.

Virtual input/output device information containing the transfer path profile shown in FIG. 35 has the same contents as in FIG. 15, and a detailed description thereof will be omitted.

The procedure of generating an image input/output device having this virtual input/output device information by referring to the transfer path profile is the same as in FIGS. 11 and 12, and a GUI used for this processing is the same as in FIG. 13.

FIG. 36 is a flow chart for explaining a subroutine for generating the transfer path profile shown in FIG. 35 from the set of selected output device profiles and input device profile.

The principle of the algorithm of this embodiment is as follows. When a plurality of selected output device profiles are present, and a plurality of output devices capable of transferring data from the input device to a tee-type device in the device profile and receiving an output condition through a tee-type filter device are present in the set of selected output devices, a path including the filter device is preferentially employed.

When the subroutine is activated for the set of an input device and a plurality of output devices to be combined, a list including all paths from the given input device to the output devices is generated in step S3601. The paths can include both a path that directly connects the input and output devices and a path that connects the input and output devices through a proxy device. A path formed from an input device sx, proxy device fy, and output device dz is represented by a trinomial set (sx,fy,dz). A path formed from the input device sx and output device dz is represented by a trinomial set (sx,0,dz). In this embodiment, only trinomial sets each formed from a source, filter, and destination will be exemplified for the descriptive convenience. However, each set can be easily extended to a set including a number of filters and capable of connecting a plurality of proxy devices.

In step S3602, one of the paths included in the list is selected, and the output device in the path is defined as an output device of interest. This output device is represented by di.

In step S3603, of all paths included in the list, paths to the output device di are counted. This is equivalent to counting sets in the list, each of which has the output device di as the third element. If the number of paths is 1, the flow advances to step S3604. Otherwise (i.e., when the number of paths is 2 or more), the flow skips to step S3608.

In step S3604, it is determined to employ the single path reaching the output device di, which is determined in the preceding step. The single determined path is removed from the list.

It is determined in step S3605 whether the path determined in the preceding step includes a proxy device. A path including a proxy device means a path represented by a trinomial set whose second element is not 0. If YES in step S3605, the flow advances to step S3606. The second element is represented by fi for the descriptive convenience. If NO in step S3605, the flow skips to step S3608.

In step S3606, it is determined to employ all paths having the second element fi in the list. The third element of each determined path is represented by dk for the descriptive convenience.

In step S3607, for all output devices dk in the paths determined in the preceding step, all paths including the output devices dk are removed from the list.

In step S3608, it is determined whether an unselected output device di remains in the list. If NO in step S3608, the flow advances to step S3609. If YES in step S3608, the flow returns to step S3602 to repeat the above steps.

In step S3609, a path score is calculated for each of all paths remaining in the list. A path score has a numerical value equal to the number of second elements of trinomial sets in the list (i.e., the number of target output devices reachable from the proxy device). The score for a path whose second element is 0 is 1.1.

In step S3610, it is determined to employ the path with the highest score out of scores calculated in the preceding step as a path to an output device dl reachable through the path.

In step S3611, all paths including the third element dl reachable through the path determined in the preceding step are erased from the list.

It is determined in step S3612 whether the path list is empty. If YES in step S3612, the subroutine is ended, and the flow returns to the main routine. If NO in step S3612, the flow returns to step S3609 to repeat the above steps until the list becomes empty.

For example, Input-Device in the transfer path profile shown in FIG. 35 is the value of Device-Id defined by the device profile of the input device, and Input-Address is the network address of the input device. Output-Device is the value of Device-Id defined by the device profile of the output device, and Output-Address is the network address of the output device. Output-Tray is the discharge destination defined in the device profile of the output device.

In this example, since two printers are selected as output devices, two sets of attributes are defined for the output devices. Additionally, in this example, proxy0 is present as a tee-type filter device capable of receiving data output from the input device. According to the device profile of proxy0, output processing from this proxy device to the two selected printers can be executed. Hence, the paths through the proxy device are preferentially used. The transfer path profile shown in FIG. 35 is designed to transmit data from scan5 to the filter device proxy0 and then transfer the data from proxy0 to lp5-3 and lp5-1.

Transmission-Mode, Resolution, Media-Size, and Data-Format select and define values that match between the device profiles of the input device, proxy device, and output device. When a plurality of matching values are present, a unique value is selected in accordance with the default priority order defined in advance, or the user is prompted to select a value using the GUI shown in FIG. 13.

The outer appearance of an operation panel 207 of a network scanner 200 is the same as shown in FIG. 16A, and the operation method is also the same.

When a scanning execute button 1603 is pressed, a copy function using this virtual input/output device is executed. According to the virtual input/output device information shown in FIG. 15, the transfer path profile shown in FIG. 35 is used, as is apparent from the value of Transmission-Profile attribute.

According to the transfer path profile of this example, data is output to two output devices lp5-3 and lp5-1 described in the Output-Set attribute, and the proxy device proxy0 described in Filter-Set relays output to the two printers. The network scanner 200 selects address 172.16.10.2 described in Filter-Address as an output device, reads an original at a resolution of 600 dpi written in the first Resolution attribute, and transmits the read data in LIPS IV written in Document-Format. At this time, data containing at least transfer path profile information (or virtual input/output device information) is also transmitted to the output device as parameters for output processing.

The proxy device 600 as proxy0 selects, as an output device, Output-Device lp5-3 with address 172.16.10.10 written in the first Output-Address and transfers the image data received from the scanner to lp5-3 at the selected destination without any image data conversion processing because the resolution of the image data is equal to 600 dpi written in the second Resolution, and the format of the image data is equal to LIPS IV written in the second Document-Format. The print data is transferred to a network printer 300 through a LAN 10. The printer 300 only prints the transferred print data independently of the transfer path profile.

The proxy device 600 as proxy0 also selects, as another output device, Output-Device lp5-1 with address 172.16.10.5 written in the second Output-Address and transfers the image data received from the scanner to lp5-1 at the selected destination without any image data conversion processing because the resolution of the image data is equal to 600 dpi written in the third Resolution, and the format of the image data is equal to LIPS IV written in the third Document-Format. The print data is transferred to a network printer 101 through the LAN 10. The printer 101 only prints the transferred print data independently of the transfer path profile.

FIG. 25 is a flow chart showing processing of inputting data from the input device and transmitting the output data to the output destination, i.e., the output device or proxy device in accordance with the logic input/output device information of this embodiment. FIG. 25 shows the procedure in the second embodiment. In the fifth embodiment, the procedure contents slightly change and therefore will be described again. S2501 to S2512 represent steps. The control procedure is stored in a ROM 103 of the scanner 200.

When the user presses the right key of a cursor panel 1602 on the operation panel 207 of the scanner 200, a virtual input/output device information acquisition request is transmitted to a server 500 in step S2501 to search for virtual input/output device information in which the input device is defined as the input device of the transfer path profile.

In step S2502, a response is waited for a predetermined period. Upon detecting a response, it is determined in step S2503 whether there are a plurality of pieces of virtual input/output device information that are respondent. If YES in step S2503, the pieces of virtual input/output device information are displayed on a liquid crystal panel 1601 of the operation panel to make the user select an arbitrary virtual input/output device in step S2504.

In step S2505, an instruction is transmitted to acquire transfer path profile information related to the selected virtual input/output device, e.g., pieces of information corresponding to the attributes shown in FIG. 35.

In step S2506, a response is waited for a predetermined period. Upon detecting a response, a connection request containing the virtual input/output device information is sent to the output destination, i.e., the output device or proxy device defined by the transfer path profile in step S2507.

It is determined in step S2508 whether connection to the output destination, i.e., the output device or proxy device is established. If YES in step S2508, the value defined in the transfer path profile is reflected on setting of the input device in step S2509, and data input processing is executed in step S2510.

In step S2511, the input data is transferred to one of the output devices or proxy devices defined in the transfer path profile in accordance with the transfer scheme defined in the transfer path profile.

In the description according to this example, a single proxy device can be in charge of transfer processing to all output devices, the series of processing operations are ended when data transfer is ended.

More strictly speaking, the transfer path generated by the processing shown in FIG. 36 may indicate transfer paths from the input device to one or more output destinations (output devices and/or proxy devices). In this case, it is confirmed whether data transfer processing for all output destinations defined by the transfer path profile is ended. If an unprocessed output destination remains, the flow returns to step S2507 or S2509 to repeat the processing until the data transfer processing for all output destinations is ended, and the processing is ended. The flow returns to step S2507 when there is no storage area for temporarily storing the input data or when the data must be input again to transfer the data to the next output destination using parameters different from those for data transfer to the preceding output destination. When the transfer data for data transfer to the preceding output destination is temporarily stored, and all the transfer parameters for the next output destination are the same as those for the preceding output destination, or when data transfer corresponding to the transfer parameters for the next output destination can be performed using only setting for transfer in step S2511 although the transfer parameters are different, the flow returns to step S2509.

If NO in step S2502, S2506, or S2510, the user is notified of the error in step S2512, and the processing is ended.

FIG. 37 is a flow chart showing processing of causing the proxy device to transfer data received from the input device as an input source to the output device in accordance with the logic input/output device information. S3701 to S3713 represent steps. The control procedure is stored in a ROM 603 of the proxy device 600.

In step S3701, the processing waits until a connection request is sent from a scanner 100 or the like to the proxy device as an output destination.

When the connection request is received, a transfer path information (FIG. 35) acquisition request is transmitted to a server 400 to search for transfer path information corresponding to the virtual input/output device information contained in the connection request in step S3703.

In step S3704, a response is waited for a predetermined period. Upon detecting a response, setting for data reception is done in step S3705 to receive data in accordance with the transfer parameters (i.e., the resolution, data format, and the like) from the input device to the proxy device, which are described in the transfer path information. In step S3706, connection to the input device as a connection source is established. In step S3707, transfer data from the input device is received in accordance with the transfer parameters described in the transfer path information, and stored in a storage device 605.

In step S3708, a connection request is sent to the output destination as the output device defined by the transfer path profile.

It is determined in step S3709 whether connection to the output destination is established. If YES in step S3709, the transfer parameters such as the resolution and format for data transfer to the output device defined in the transfer path profile are reflected on transmission mode conversion setting of the proxy device, and data transmission processing is executed in step S3710.

In step S3711, the input data is transmitted to one of the output devices or proxy devices defined in the transfer path profile in accordance with the transfer scheme defined in the transfer path profile.

It is confirmed in step S3712 whether data transfer processing to all output devices defined in the transfer path profile is ended. If NO in step S3712, the flow returns to step S3708 to repeat the data transfer processing until the processing for all output destinations is ended, and the processing is ended.

If NO in step S3704 or S3709, the user is notified of the error in step S3713, and the processing is ended.

In this embodiment, the input device repeats unicast communication with N output devices which are combined with the input device by a transfer path profile, thereby sequentially transferring output data. However, when a protocol for simultaneously communicating with a group consisting of a plurality of nodes in the network, like multicast of IP protocol, can be used, the multicast communication may be used to simultaneously transfer data to a set of a plurality of output devices contained in a desired transfer path profile.

In this embodiment, two printers are exemplified as a set of output devices. However, the plurality of output devices designated in the transfer path profile need not always be devices of the same type. That is, not only a plurality of printers but also a set of devices of different kinds such as image filing devices and facsimile devices may be described in a transfer path profile to form a virtual input/output device with a plurality of outputs as long as the devices can be output destinations of the transfer data.

In this embodiment, the input device, output device, and proxy device form independent network nodes. However, some of the functions of the devices may be arranged in one network node, i.e., device. In this case, an input device or output device having the function of executing the transfer function to a plurality of output devices may be provided for another input device. The server computer may have the function of the proxy device.

In this embodiment, the server 500 stores the device profile, transfer path profile, user profile, and virtual input/output device definition information. When the server 500 is not present, the input or output device that receives a device profile acquisition request may directly notify the request source of the current configuration information by itself. The transfer path profile and virtual input/output device definition may also be stored in the recording device of the host computer, which has generated these pieces of information, and transmitted to the input or output device in accordance with a request from the device. Alternatively, after the transfer path profile and virtual input/output device definition are generated, they may be transmitted to the input and output devices as an input source and output destination and stored in the storage devices of the input and output devices such that the information can be acquired from these devices.

As described above, according to this embodiment, even in a multi-functional system which flexibly combines an arbitrary input device and a plurality of output devices to provide a composite function, the number of times of transfer directly controlled by an appropriate input device can be decreased. As a result, the input device can start the next input processing before output processing to all output destinations, so the throughput of the device improves. In addition, the load on the input device for transfer control decreases, occupying the valuable resources for the input device, i.e., the CPU performance, memory capacity, the access band, bus band, and network interface band of the storage device, and the like can be reduced, and the resources required to implement a scanner device can be decreased, resulting in cost reduction.

According to this embodiment, even when different control methods are used to request output to a plurality of output destinations, only the proxy device need to systematically manage the control methods, and only the proxy device need to selectively use the control methods. This not only makes the input device simple and versatile but also facilitates system building by concentrating the methods of controlling the output devices and facilitates system management.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is achieved even by supplying a storage medium (or recording medium) which stores software program codes for implementing the functions of the above-described embodiments to the system or apparatus and causing the computer (or a CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the operation system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above in detail, according to the present invention, using input and output devices connected to a network, a virtual input/output device of a more flexible combination can be constituted by combining input and output devices whose data transfer control directions do not match.

Since a proxy device converts transfer data in relaying data transfer, a virtual input/output device of a more flexible combination can be constituted by combining input and output devices whose processible transfer data expression formats are different.

In implementing a composite function for an input and multiple outputs, a transfer path in which a proxy device for relaying data transfer is inserted between the input-side device and the plurality of output-side devices is defined in advance, and this definition is used to select and control the composite function. This reduces the load necessary for the input device. Hence, the input device need not have any high performance CPU or large-capacity or high-speed memory, so an inexpensive input device can be implemented.

Since the input device can entrust the proxy device with all processing operations for the plurality of output devices, the input device can be quickly released from individual transfer processing operations and start the next input processing. Hence, the input throughput of the system can be improved.

Since the input device can entrust the proxy device with all processing operations for the plurality of output devices, only the proxy device need to unitarily manage and execute transfer processing for the output devices using different parameters. Since the input device becomes simple and versatile, and the methods of controlling the output devices are concentrated to the proxy device, the system building and system management can be easy.

As many apparently widely different embodiments of the present invention can be made without departing from the spirit and scope thereof, it is to be understood that the invention is not limited to the specific embodiments thereof except as defined in the appended claims.

What is claimed is:

1. A system, comprising:
a generating unit that generates transfer information describing a combination of a plurality of devices on the basis of device information corresponding to each of the plurality of devices, the transfer information including information that indicates each of the plurality of devices is a predetermined device type which passively executes data communication with an external device in accordance with an instruction from the external device which can actively start data communication;
an operation unit that accepts a selection of a desired transfer information from the generated transfer information by a user;
a reception unit that, in a case where a first device represented by the selected transfer information is the predetermined device type, actively starts data communication with the first device to receive image data from the first device; and
a transmission unit that, in a case where a second device represented by the selected transfer information is the predetermined device type, actively starts data communication with the second device to transmit the received image data to the second device.

2. The system according to claim 1, wherein said reception unit transmits the selected transfer information to the first device in order to control the first device, and said transmission unit transmits the selected transfer information to the second device in order to control the second device.

3. The system according to claim 1, wherein the transfer information contains a protocol used to transfer the data, a data format of the data to be transferred, and an address representing a destination to which the data is to be transferred.

4. A method for transmitting image data, said method comprising the steps of:
generating transfer information describing a combination of a plurality of devices on the basis of device information corresponding to each of the plurality of devices, the transfer information including information that indicates each of the plurality of devices is a predetermined device type which passively executes data communication with an external device in accordance with an instruction from the external device which can actively start data communication;
accepting a selection by a user of a desired transfer information from the generated transfer information; and
in a case where a first device represented by the selected transfer information is the predetermined device type and a second device represented by the selected transfer information is the predetermined device type, actively starting data communication with the first device and the second device to transmit data, from the first device, to the second device.

5. The method according to claim 4, wherein
in said transmitting step, the selected transfer information is transmitted to the first device in order to control the first device, and
in said transmitting step, the selected transfer information is transmitted to the second device in order to control the second device.

6. The method according to claim 4, wherein the transfer information contains a protocol used to transfer the data, a data format of the data to be transferred, and an address representing a destination to which the data is to be transferred.

7. A computer executable program embodied in a computer readable storage medium, for making a computer execute data transmission, said program comprising the steps of:
generating transfer information describing a combination of a plurality of devices on the basis of device information corresponding to each of the plurality of devices, the transfer information including information that indicates each of the plurality of devices is a predetermined device type which passively executes data communication with an external device in accordance with an instruction from the external device which can actively start data communication;
accepting a selection by a user of a desired transfer information from the generated transfer information; and
in a case where a first device represented by the selected transfer information is the predetermined device type and a second device represented by the selected transfer information is the predetermined device type, actively starting data communication with the first device and the second device to transmit data, from the first device, to the second device.

8. A system, comprising:
a generating unit that generates transfer information describing a combination of a plurality of devices on the basis of device information corresponding to each of the plurality of devices, the transfer information including information that indicates each of the plurality of devices is a predetermined device type which actively starts data communication with an external device;
an operation unit that accepts a selection of desired transfer information from the generated transfer information by a user;
a reception unit that, in a case where a first device represented by the selected transfer information is the predetermined device type, passively executes data communication with the first device in accordance with an instruction from the first device, to receive image data from the first device; and
a transmission unit that, in a case where a second device represented by the selected transfer information is the predetermined device type, passively executes data communication with the second device in accordance with an instruction from the second device, to transmit the received image data to the second device.

9. The system according to claim 8, further comprising an acquisition unit that acquires the selected transfer information in order to receive the image data from the first device and transmit the image data to the second device.

10. The system according to claim 8, wherein the transfer information contains a protocol used to transfer the data, a data format of the data to be transferred, and an address representing a destination to which the data is to be transferred.

11. The system according to claim 8, further comprising an identification information reception unit that receives first identification information for identifying the generated transfer information from the first device and receives second identification information for identifying the generated transfer information, wherein said transmission unit transmits the image data if the second identification information corresponds to the first identification information.

12. A method, comprising:

a generating step of generating transfer information describing a combination of a plurality of devices on the basis of device information corresponding to each of the plurality of devices, the transfer information including information that indicates each of the plurality of devices is a predetermined device type which actively starts data communication with an external device;

an accepting step of accepting a selection by a user of desired transfer information from the generated transfer information;

a reception step of, in a case where a first device represented by the selected transfer information is the predetermined device type, passively executing data communication with the first device in accordance with an instruction from the first device, to receive image data from the first device; and a transmission step of, in a case where a second device represented by the selected transfer information is the predetermined device type, passively executing data communication with the second device in accordance with an instruction from the second device, to transmit the received image data to the second device.

13. The method according to claim 12, further comprising an acquisition step of acquiring the selected transfer information in order to receive the image data from the first device and transmit the image data to the second device.

14. The method according to claim 12, wherein the transfer information contains a protocol used to transfer the data, a data format of the data to be transferred, and an address representing a destination to which the data is to be transferred.

15. The method according to claim 12, further comprising an identification information reception step of receiving first identification information for identifying the generated transfer information from the first device and receiving second identification information for identifying the generated transfer information, wherein, in said transmission step, the image data is transmitted if the second identification information corresponds to the first identification information.

* * * * *

UNITED STATES PATENT AND TRADEMARK OFFICE
CERTIFICATE OF CORRECTION

PATENT NO.         : 7,167,258 B2
APPLICATION NO.    : 09/801815
DATED              : January 23, 2007
INVENTOR(S)        : Masahito Yamamoto Page 1 of 1

It is certified that error appears in the above-identified patent and that said Letters Patent is hereby corrected as shown below:

ON THE TITLE PAGE, AT ITEM (57), ABSTRACT:

Line 7, "read" should read --to read--.

COLUMN 19:

Line 19, "attributes" should read --attribute--.

Signed and Sealed this

Fourth Day of December, 2007

JON W. DUDAS
*Director of the United States Patent and Trademark Office*